(12) United States Patent
Nakamura et al.

(10) Patent No.: US 9,045,632 B2
(45) Date of Patent: Jun. 2, 2015

(54) METHOD FOR PRODUCING COMPOSITION FOR INJECTION MOLDING COMPRISING CRYOGENIC GRINDING OF RESIN COMPONENTS, AND COMPOSITION FOR INJECTION MOLDING

(71) Applicant: Seiko Epson Corporation, Tokyo (JP)

(72) Inventors: Hidefumi Nakamura, Hachinohe (JP); Nobuyuki Hamakura, Yuzawa (JP)

(73) Assignee: Seiko Epson Corporation (JP)

( * ) Notice: Subject to any disclaimer, the term of this patent is extended or adjusted under 35 U.S.C. 154(b) by 212 days.

(21) Appl. No.: 13/687,305

(22) Filed: Nov. 28, 2012

(65) Prior Publication Data

US 2013/0136926 A1   May 30, 2013

(30) Foreign Application Priority Data

Nov. 30, 2011 (JP) ................................ 2011-262958

(51) Int. Cl.
*B32B 5/16* (2006.01)
*B22C 25/00* (2006.01)
(Continued)

(52) U.S. Cl.
CPC ............ *C08L 63/00* (2013.01); *Y10T 428/2993* (2015.01); *C08L 59/00* (2013.01); *C08K 3/0033* (2013.01); *B22F 1/0059* (2013.01); *B22F 3/225* (2013.01); *B22F 2001/0066* (2013.01); *C04B 35/6263* (2013.01); *C04B 35/62675* (2013.01); *C04B 35/634* (2013.01); *C04B 35/6342* (2013.01); *C04B 35/63424* (2013.01); *C04B 35/63452* (2013.01); *C04B 2235/5436* (2013.01); *C04B 2235/6022* (2013.01); *B28B 1/24* (2013.01); *B28B 11/243* (2013.01)

(58) Field of Classification Search
CPC ................ C08J 3/12; C08J 5/00; C08J 5/042; C08J 7/08
USPC ..................... 428/403–407; 241/14
See application file for complete search history.

(56) References Cited

U.S. PATENT DOCUMENTS 7,811,512 B2   10/2010   Sakata et al.
7,993,576 B2   8/2011   Sakata et al.
(Continued)

FOREIGN PATENT DOCUMENTS

| JP | 11-131103 | 5/1999 |
| JP | 2008-075153 | 4/2008 |
| JP | 2008-075154 | 4/2008 |
| JP | 2008-222535 | 9/2008 |
| JP | 2008-223127 | 9/2008 |

(Continued)

OTHER PUBLICATIONS

Madhuka, Cryogenic Grinding, 23 pages (circa 2000).*

*Primary Examiner* — Holly Le
(74) *Attorney, Agent, or Firm* — Harness, Dickey & Pierce, P.L.C.

(57) ABSTRACT

A method for producing a composition for injection molding which contains an inorganic powder composed of at least one of a metal material and a ceramic material and a binder containing a polyacetal-based resin and a glycidyl group-containing polymer. The method includes: cryogenically grinding a first resin containing the polyacetal-based resin as a main component; cryogenically grinding a second resin containing the glycidyl group-containing polymer as a main component; mixing a powder obtained by grinding the first resin, a powder obtained by grinding the second resin, and the inorganic powder, thereby obtaining a mixed powder; and kneading the mixed powder.

20 Claims, 2 Drawing Sheets

(51) Int. Cl.
*C08L 63/00* (2006.01)
*C08L 59/00* (2006.01)
*B22F 1/00* (2006.01)
*B22F 3/22* (2006.01)
*C04B 35/626* (2006.01)
*C04B 35/634* (2006.01)
*B28B 1/24* (2006.01)
*B28B 11/24* (2006.01)
*B29C 45/78* (2006.01)
*C08K 3/00* (2006.01)

(56) References Cited

U.S. PATENT DOCUMENTS

| | | | |
|---|---|---|---|
| 2002/0176979 A1* | 11/2002 | Evans | 428/292.1 |
| 2008/0227906 A1 | 9/2008 | Sakata et al. | |
| 2011/0314964 A1* | 12/2011 | Ishigami et al. | 75/228 |
| 2013/0133481 A1* | 5/2013 | Hamakura et al. | 75/230 |

FOREIGN PATENT DOCUMENTS

| | | |
|---|---|---|
| JP | 2012-007212 | 1/2012 |
| JP | 2012-007223 | 1/2012 |

\* cited by examiner

METHOD FOR PRODUCING COMPOSITION FOR INJECTION MOLDING COMPRISING CRYOGENIC GRINDING OF RESIN COMPONENTS, AND COMPOSITION FOR INJECTION MOLDING

BACKGROUND

1. Technical Field

The present invention relates to a method for producing a composition for injection molding and a composition for injection molding.

2. Related Art

A powder metallurgy process for producing a metal product by sintering a molded body containing a metal powder has been widely used in many industrial fields recently because a near net shape sintered compact can be obtained using the process. Further, a ceramic powder can be used in place of a metal powder. There are many methods for producing a molded body (molding methods), and a powder injection molding method in which an inorganic powder and an organic binder are mixed and kneaded, and injection molding is performed using the resulting kneaded material (compound) is known. A molded body produced by such a powder injection molding method is then subjected to a degreasing treatment to remove the organic binder, followed by firing, whereby a metal product or a ceramic product in a desired shape is obtained.

In such a powder injection molding method, first, a metal powder and an organic binder are kneaded to obtain a kneaded material (see, for example, JP-A-11-131103). Then, the obtained kneaded material is subjected to injection molding, and the resulting molded body is degreased and fired, whereby a sintered compact is obtained.

However, in the case where the particle diameter of the organic binder powder is larger than that of the metal powder, it takes considerable time to uniformly mix these powders, and the temperature of the kneaded material is increased by self-heating, and the organic binder is decomposed due to the heat, resulting in the deterioration of the original function of the organic binder.

Further, a resin material to be used as the organic binder has significantly different properties from those of the metal powder, and therefore, both powders are easily separated from each other and the resin material and the metal powder are liable to be unevenly distributed in the composition. Due to this, even if a molded body is obtained by molding the obtained composition for injection molding, a problem of shape retainability such as low dimensional accuracy occurs.

SUMMARY

An advantage of some aspects of the invention is to provide a composition for injection molding capable of obtaining a composition for injection molding in which an organic powder and a binder are less unevenly distributed, and as a result, capable of producing a sintered compact which is less deformed, chipped, or the like and which has high quality, and a method for producing such a composition for injection molding.

An aspect of the invention is directed to a method for producing a composition for injection molding which contains an inorganic powder composed of at least one of a metal material and a ceramic material; and a binder containing a polyacetal-based resin and a glycidyl group-containing polymer, wherein the method includes: cryogenically grinding a first resin containing the polyacetal-based resin as a main component; cryogenically grinding a second resin containing the glycidyl group-containing polymer as a main component; mixing a powder obtained by grinding the first resin, a powder obtained by grinding the second resin, and the inorganic powder, thereby obtaining a mixed powder; and kneading the mixed powder.

According to this configuration, a composition for injection molding in which an organic powder and a binder are less unevenly distributed can be obtained, and as a result, a composition for injection molding capable of producing a sintered compact, which is less deformed, chipped, or the like and has high quality, can be efficiently produced.

It is preferred that the melting point of the glycidyl group-containing polymer is lower than that of the polyacetal-based resin and the mass content of the glycidyl group-containing polymer in the composition for injection molding is less than that of the polyacetal-based resin.

According to this configuration, the second resin is melted and flows prior to the first resin when kneading, and therefore, the second resin is present so as to cover each particle of the inorganic powder and further, the first resin is present so as to cover the outside of the second resin. Accordingly, the significant decomposition of the first resin is suppressed, and a composition for injection molding capable of forming a molded body having high shape retainability is obtained.

It is preferred that the mixed powder is kneaded at a temperature between the melting point of the first resin and the melting point of the second resin.

According to this configuration, only the second resin is melted as the temperature is raised when kneading, and the second resin easily penetrates between the inorganic powder particle and the first resin. As a result, the shape retainability and the moldability can both be enhanced.

It is preferred that the second resin is an unsaturated glycidyl group-containing polymer.

According to this configuration, high adhesiveness is exhibited between the inorganic powder and the second resin, and therefore, the significant decomposition of the first resin can be more reliably suppressed.

It is preferred that the melting point of the unsaturated glycidyl group-containing polymer is 65° C. or higher and 105° C. or lower.

According to this configuration, only the second resin is reliably melted as the temperature is raised when kneading, and the second resin easily penetrates between the inorganic powder particle and the first resin.

It is preferred that the unsaturated glycidyl group-containing polymer is a copolymer containing an unsaturated glycidyl group-containing monomer and an ethylenically unsaturated ester compound monomer.

According to this configuration, the second resin reliably functions as a partition which separates the inorganic powder particle from the first resin. As a result, a decrease in the shape retainability of a molded body can be suppressed.

It is preferred that the unsaturated glycidyl group-containing polymer is a copolymer containing an unsaturated glycidyl group-containing monomer and a nonpolar α-olefin-based monomer.

According to this configuration, the second resin can be stably present between the inorganic powder particle and the first resin. As a result, a decrease in the shape retainability of a molded body can be particularly suppressed.

It is preferred that the average particle diameter of the binder powder is 2 times or more and 50 times or less larger than that of the inorganic powder.

According to this configuration, the mass of the inorganic powder particle is close to that of the binder powder particle, and therefore, the particles of these components can be more uniformly mixed.

Another aspect of the invention is directed to a composition for injection molding, which is produced by the method for producing a composition for injection molding according to the aspect of the invention, and has an inner layer, which is composed mainly of the second resin and is provided so as to cover each particle of the inorganic powder, and an outer layer, which is composed mainly of the first resin and is located outside the inner layer.

According to this configuration, a composition for injection molding capable of producing a sintered compact which is less deformed, chipped, or the like and has high quality is obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
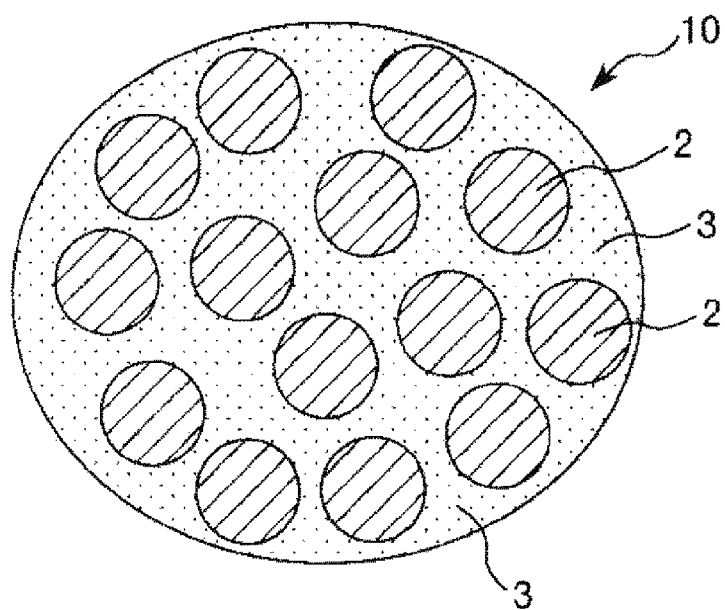
FIG. 1 is a cross-sectional view schematically showing a structure of a composition for injection molding according to an embodiment of the invention before kneading.

Hereinafter, a method for producing a composition for injection molding and a composition for injection molding of the invention will be more specifically described based on preferred embodiments with reference to the accompanying drawings.

Method for Producing Composition for Injection Molding

The method for producing a composition for injection molding of the embodiment of the invention is a method for producing a composition to be subjected to injection molding, and the composition to be produced contains an inorganic powder and a binder.

The inorganic powder is composed of at least one of a metal material and a ceramic material.

The binder contains a first resin containing a polyacetal-based resin as a main component and a second resin containing a glycidyl group-containing polymer as a main component, wherein the content of the second resin is smaller than that of the first resin.

The composition for injection molding produced according to the embodiment of the invention is uniform and has high shape retainability, and therefore, enables the production of a sintered compact which is less deformed, chipped, or the like and has high quality.

The method for producing a composition for injection molding according to this embodiment includes: a first grinding step of cryogenically grinding the first resin, thereby obtaining a first powder; a second grinding step of cryogenically grinding the second resin, thereby obtaining a second powder; a mixing step of mixing the first powder, the second powder, and the inorganic powder, thereby obtaining a mixed powder; and a kneading step of kneading the mixed powder. Hereinafter, the respective steps will be sequentially described.

[1] Grinding Step

First, an inorganic powder and a binder to be used in the production of the composition for injection molding are prepared.

As the inorganic powder, as described above, a powder composed of at least one of a metal material and a ceramic material is used. Specifically, other than a metal powder and a ceramic powder, a powder of a composite material of a metal material and a ceramic material, and a mixed powder of a metal powder and a ceramic powder can be exemplified.

The binder to be used in the invention contains a first resin and a second resin whose content is smaller than that of the first resin.

The inorganic powder and the binder will be described in detail later.

Subsequently, the first resin and the second resin are separately ground cryogenically. By doing this, a first powder and a second powder are obtained (a first grinding step and a second grinding step). Here, the cryogenic grinding of the first resin will be described as a representative.

The cryogenic grinding is a method of finely and uniformly grinding a sample by utilizing the brittleness caused by the freezing of the sample. In the cryogenic grinding, a cryogenic grinding machine is used. The cryogenic grinding machine is provided with a grinding vessel, in which a sample is placed, and steel balls, which reciprocate in the grinding vessel, and by causing the steel balls to reciprocate while cooling the grinding vessel with a cooling agent such as liquid nitrogen, a sample in the grinding vessel is ground. As cooling progresses, the sample becomes brittle, and therefore, a sample with flexibility can also be ground. The above-described cryogenic grinding machine is described as one example, and a cryogenic grinding machine having other structure can also be used.

By cryogenically grinding the first resin, the first resin can be ground finely and uniformly without denaturating the first resin. In the case of using a grinding method other than cryogenic grinding, heat is generated in the first resin as grinding progresses, and due to this heat, denaturation, melting (softening), or decomposition cannot be avoided, however, by using cryogenic grinding, this denaturation, melting, and decomposition can be prevented. As a result, the first resin is to be subjected to the following step while maintaining the original property, and therefore, a decrease in shape retainability of a molded body is prevented. Eventually, it is possible to produce a sintered compact which is less deformed, chipped, or the like and has high quality. When using cryogenic grinding, the resulting powder is fine and has a large specific surface area and also has a high surface activity because the denaturation thereof is suppressed. Such a powder has high affinity for the inorganic powder, and when mixing the binder powder with the inorganic powder, the powder contributes to the suppression of the occurrence of a problem such as uneven distribution. Accordingly, the use of cryogenic grinding enables the production of a particularly uniform composition for injection molding.

As the cooling agent for use in cryogenic grinding, other than liquid nitrogen as described above, liquid air, liquid oxygen, dry ice, or the like may be used.

The second resin can also be cryogenically ground in the same manner.

The thus obtained first powder and second powder each have an average particle diameter of preferably about 10 μm or more and 500 μm or less, and more preferably about 15 μm or more and 400 μm or less. By grinding the resin through cryogenic grinding to a particle diameter within the above range, the first powder and the second powder can be uniformly mixed. Further, by setting the particle diameter after cryogenic grinding in the above range, the effect of a difference in specific gravity during mixing when these powders and the inorganic powder are mixed in the below-described mixing step can be suppressed to minimum, and therefore, the binder powder and the inorganic powder can be uniformly mixed also when mixing the binder powder and the inorganic powder.

The average particle diameter is obtained by a laser diffraction method as a particle diameter when the cumulative amount of a powder on a volume basis reaches 50%.

It is preferred to cryogenically grind a binder component other than the first resin and the second resin, however, such a binder component may be ground through other grinding method. The binder powder is obtained as described above.

[2] Mixing Step

Subsequently, the inorganic powder and the binder powder are mixed, whereby a mixture is obtained.

In the mixing, any of various mixing machines, for example, a stirring mixing machine, a V-type mixing machine, a W-type mixing machine, a ribbon mixing machine, a drum mixer, a ball mill, or the like is used.

The binder powder containing the first powder obtained by cryogenic grinding has a characteristic of being uniformly intermingled with the inorganic powder as described above, and therefore, a uniform mixture can be obtained in this step without causing uneven distribution or the like.

The mixing may be performed by either a wet process or a dry process, however, mixing is performed while cooling as needed. The temperature of a sample when mixing is preferably not higher than the melting point of the binder powder. According to this, the particulate shape of the binder powder can be maintained, and uniform mixing can be achieved by utilizing the property of the binder powder which is easy to roll over. If the binder powder does not have a melting point, the temperature of a sample when mixing is preferably not higher than the softening point of the binder powder.

The volume ratio of the binder powder to the inorganic powder is preferably 0.2 or more and 0.6 or less, and more preferably 0.3 or more and 0.5 or less. According to this, the moldability and the shape retainability can be improved and also the sintering density can be improved.

The average particle diameter of the binder powder is preferably 2 times or more and 50 times or less, and more preferably 3 times or more and 10 times or less larger than that of the inorganic powder. By setting the average particle diameters of the inorganic powder and the binder powder so as to satisfy the above relationship, the mass of the inorganic powder particle is close to that of the binder powder particle, and therefore, the particles of these components can be more uniformly mixed.

The average particle diameter of the first powder is preferably 3 times or more and 20 times or less, and more preferably 7 times or more and 15 times or less larger than that of the inorganic powder. Meanwhile, the average particle diameter of the second powder is preferably 3 times or more and 50 times or less, and more preferably 5 times or more and 30 times or less larger than that of the inorganic powder. According to this, the binder powder and the inorganic powder can be more uniformly mixed.

Further, the average particle diameter of the second powder is preferably 2 times or more and 15 times or less, and more preferably 3 times or more and 10 times or less larger than that of the first powder. According to this, the first powder and the second powder can be more uniformly mixed.

[3] Kneading Step

Subsequently, the obtained mixture is kneaded, whereby a kneaded material, i.e., the composition for injection molding of the embodiment of the invention is obtained.

When kneading the mixture, any of various kneading machines, for example, a pressure or double-arm kneader-type kneading machine, a roller-type kneading machine, a Banbury-type kneading machine, a single-screw or twin-screw extruding machine, or the like is used.

When kneading the mixture, an additive such as an organic solvent may be added to the mixture as needed.

As the first resin, a resin containing a polyacetal-based resin as a main component is used, and as the second resin, a resin containing a glycidyl group-containing polymer as a main component is used. In the first resin, as a component other than the main component, a glycidyl group-containing polymer may be contained, and the below-described lubricant or other component may be contained. Similarly, in the second resin, as a component other than the main component, a polyacetal-based resin may be contained, and the below-described lubricant or other component may be contained. As the glycidyl group-containing polymer, a polymer having a lower melting point than the polyacetal-based resin is preferably used. If there is a difference in melting point between the glycidyl group-containing polymer and the polyacetal-based resin in this manner, when the temperature of the mixture is raised as kneading progresses, the glycidyl group-containing polymer is melted and flows prior to the polyacetal-based resin. As a result, the flowing glycidyl group-containing polymer penetrates so as to cover the inorganic powder particle. Further, since the polyacetal-based resin is a relatively rigid resin, a gap between the polyacetal-based resin and the inorganic powder is easily formed, and therefore, the penetration of the glycidyl group-containing polymer is accelerated. As a result, in the kneaded material obtained in this step, the glycidyl group-containing polymer is present so as to cover the inorganic powder particle, and further, the polyacetal-based resin is present so as to cover the outside of the glycidyl group-containing polymer.

Figure 2:
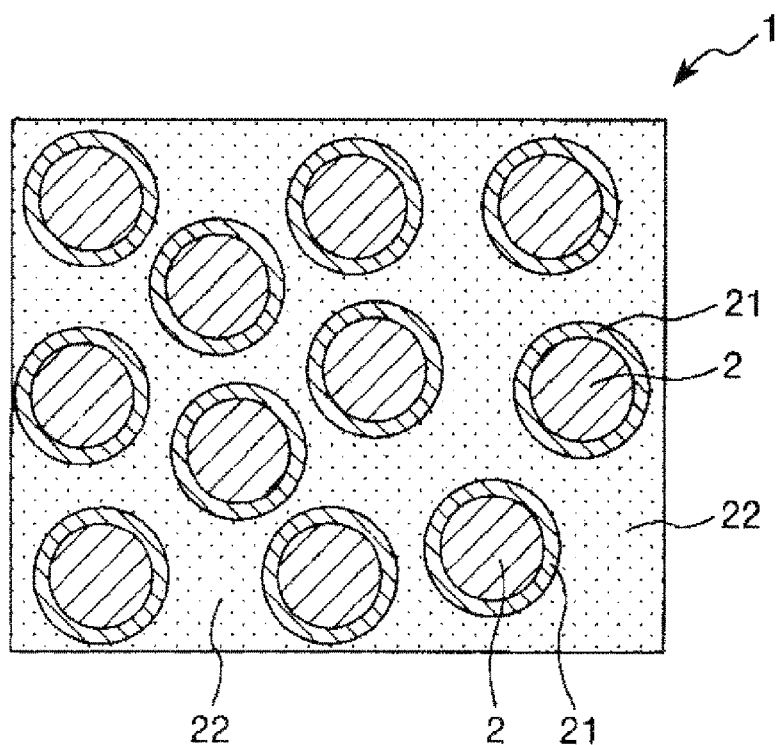
FIG. 2 is a cross-sectional view schematically showing a structure of a composition for injection molding according to an embodiment of the invention (after kneading).

FIG. 1 is a cross-sectional view schematically showing a structure of the composition for injection molding of the embodiment of the invention before kneading, and FIG. 2 is a cross-sectional view schematically showing a structure of the composition for injection molding of the embodiment of the invention (after kneading).

In the mixture before kneading, as shown in FIG. 1, a plurality of inorganic powder particles 2 are dispersed in a binder 3. In the binder 3, the polyacetal-based resin, the glycidyl group-containing polymer, and the like. intermingle with one another.

When kneading such a mixture, the temperature of the mixture is increased by heating from the outside or self-heating accompanying kneading. As a result, as shown in FIG. 2, in the obtained kneaded material 1, an inner layer 21 containing the glycidyl group-containing polymer as a main material is formed so as to cover the particle 2, and an outer layer 22 containing the polyacetal-based resin as a main material is located outside the inner layer 21.

The polyacetal-based resin which is the main component of the first resin has a relatively high rigidity, and therefore has been used as a binder component for a long time. However, the polyacetal-based resin is decomposed during kneading, and has a problem that the shape retainability at the time of degreasing is deteriorated.

In view of this, the present inventors made intensive studies of the cause of the deterioration of the shape retainability when the polyacetal-based resin is used as a binder component. As a result, they found that a metallic element in the inorganic powder functions as a catalyst to accelerate the decomposition of the polyacetal-based resin.

Accordingly, in the embodiment of the invention, by using the polyacetal-based resin in combination with the glycidyl group-containing polymer having a lower melting point than the polyacetal-based resin, the decomposition of the polyacetal-based resin is suppressed, and a decrease in the shape retainability is suppressed. To be more specific, when the inner layer 21 is formed as described above, the inner layer 21 serves as a partition and prevents the contact between the metallic element in the particle 2 and the outer layer 22, whereby the above-described catalytic activity is suppressed. As a result, the rapid decomposition of the binder 3 is suppressed, and a decrease in shape retainability can be avoided. That is, due to the presence of the inner layer 21, when a molded body is subjected to a degreasing treatment, the outer layer 22 is not rapidly, but gradually decomposed by heat, and therefore, the shape of the molded body is easily maintained.

In order to obtain such an effect, in the binder, the polyacetal-based resin and the glycidyl group-containing polymer are required to behave as described above. In order for these components to behave as described above, it is important for the polyacetal-based resin and the glycidyl group-containing polymer to be uniformly intermingled with each other. In the embodiment of the invention, as described above, by cryogenically grinding the first resin containing the polyacetal-based resin and the second resin containing the glycidyl group-containing polymer in advance, the first powder and the second powder which are fine and have a high surface activity can be produced, and the polyacetal-based resin and the glycidyl group-containing polymer can be extremely uniformly mixed. As a result, the above-described effect of the invention can be obtained.

The kneading temperature in this step is preferably set according to the melting points of the polyacetal-based resin and the glycidyl group-containing polymer. Specifically, since the glycidyl group-containing polymer has a lower melting point than the polyacetal-based resin, the initial kneading temperature is preferably set to a temperature between the melting point of the glycidyl group-containing polymer and the melting point of the polyacetal-based resin. By kneading the components at a temperature within the above range, only the glycidyl group-containing polymer is melted as the temperature is raised when kneading so that it becomes easy for the glycidyl group-containing polymer to penetrate between the particle 2 and the polyacetal-based resin. As a result, the inner layer 21 and the outer layer 22 are formed, whereby both the shape retainability and the moldability can be highly achieved.

When the melting point of the polyacetal-based resin is represented by $T_A$° C. and the melting point of the glycidyl group-containing polymer is represented by $T_B$° C., the kneading temperature is more preferably $(T_B+5)$° C. or higher and $(T_A-5)$° C. or lower. By kneading the components at a temperature within the above range, the above-described effect becomes more pronounced. Further, it is preferred that such a kneading temperature is maintained for about 5 minutes or more and 180 minutes or less.

After completing the kneading under the above conditions, kneading may be performed at a temperature higher than the melting point of the polyacetal-based resin ($T_A$) in the end. According to this, also the polyacetal-based resin is melted, and the fluidity of the entire kneaded material is further improved. In this case, the final kneading temperature is preferably $T_A$° C. or higher and $(T_A+70)$° C. or lower.

The total kneading time is preferably about 15 minutes or more and 210 minutes or less.

The viscosity of the thus obtained kneaded material is preferably 500 P or more and 7,000 P or less (50 Pa·s or more and 700 Pa·s or less), and more preferably 1,000 P or more and 6,000 P or less (100 Pa·s or more and 600 Pa·s or less). According to this, the moldability when molding can be particularly enhanced. The viscosity is measured using a capirograph by maintaining the temperature of the kneaded material at 190° C.

In the case where a lubricant is contained in the binder 3, by melting the lubricant first, a base layer is formed when the glycidyl group-containing polymer penetrates as described above. To be more specific, the lubricant forms an innermost layer inside the inner layer 21. It is considered that this innermost layer suppresses the flow resistance of the surface of the particle 2 to accelerate the penetration of the glycidyl group-containing polymer. As a result, the inner layer 21 is reliably formed in a shorter time.

The lubricant is preferably added in a smaller amount than the polyacetal-based resin or the glycidyl group-containing polymer. According to this, the fluidity of the polyacetal-based resin or the glycidyl group-containing polymer can be enhanced without impairing the properties of the polyacetal-based resin or the glycidyl group-containing polymer. As a result, the inner layer 21 composed mainly of the glycidyl group-containing polymer is more promptly and reliably formed, and also more excellent fluidity is imparted to the outer layer 22 composed mainly of the polyacetal-based resin. Accordingly, both the shape retainability and the moldability can be highly achieved.

The thickness of the inner layer 21 is not particularly limited as long as the inner layer 21 covers the surface of the particle 2, however, for example, an average thickness thereof is preferably 1 nm or more and 2,000 nm or less, and more preferably 2 nm or more and 1,000 nm or less. According to this, both the shape retainability and the moldability (shape transferability) can be highly achieved. If the average thickness of the inner layer 21 is lower than the above lower limit, the inner layer 21 is likely to be discontinuous, and therefore, the particle 2 and the outer layer 22 may come into contact with each other. On the other hand, if the average thickness thereof exceeds the above upper limit, the ratio of the outer layer 22 is relatively decreased, and therefore, the moldability may be deteriorated.

The outer layer 22 may not be in the form of a layer as long as it is located outside the inner layer 21, and may be in the form such that the outer layers 22 associated with the respective particles 2 are connected to one another, i.e., as shown in FIG. 2, in the kneaded material 1, the outer layer 22 may be in the form of a matrix in which the particles 2 are dispersed.

The inner layer 21 is preferably composed mainly of the glycidyl group-containing polymer, but may contain the polyacetal-based resin, the lubricant, or another component. Similarly, the outer layer 22 is preferably composed mainly of the polyacetal-based resin, but may contain the glycidyl group-containing polymer, the lubricant, or another component, and the innermost layer may be composed mainly of the lubricant, but may contain the polyacetal-based resin, the glycidyl group-containing polymer, or another component. The content of the glycidyl group-containing polymer in the inner layer 21 may be more than 50% on a volume basis, and similarly, the content of the polyacetal-based resin in the outer layer 22 and the content of the lubricant in the innermost layer may be more than 50% on a volume basis, respectively.

At a boundary between the inner layer 21 and the outer layer 22 or a boundary between the inner layer 21 and the innermost layer, the constituent materials may continuously change through the interface, however, it is preferred that the constituent materials discontinuously change. According to such a configuration, the interface between the inner layer 21 and the outer layer 22 or the interface between the inner layer 21 and the innermost layer serves as a sliding surface, and the fluidity of the composition for injection molding is particularly improved. As a result, the moldability at the time of injection molding is particularly enhanced, and eventually, a sintered compact having high dimensional accuracy is obtained.

Inorganic Powder

Here, the inorganic powder to be used in the invention will be described in detail.

As the inorganic powder, as described above, a powder composed of at least one of a metal material and a ceramic material is used. Specifically, other than a metal powder and a ceramic powder, a powder of a composite material of a metal material and a ceramic material, and a mixed powder of a metal powder and a ceramic powder can be exemplified.

Examples of the metal material include Mg, Al, Ti, V, Cr, Mn, Fe, Co, Ni, Cu, Zn, Y, Zr, Nb, Mo, Pd, Ag, In, Sn, Ta, W, an alloy of some of these metallic elements, and an alloy of any of these metallic elements with another metallic element, and among these metal materials, one metal material or a mixture of two or more metal materials is used.

Among these metal materials, particularly, a stainless steel, a die steel, a high-speed tool steel, a low-carbon steel, any of a variety of Fe-based alloys such as an Fe—Ni-based alloy, an Fe—Si-based alloy, an Fe—Co-based alloy, and an Fe—Ni—Co-based alloy, an Al-based alloy, a Ti-based alloy, or the like is preferably used. Such a metal material has excellent mechanical properties, and therefore, a sintered compact which has excellent mechanical properties and can be used in a wide range of application is obtained.

Examples of the stainless steel include SUS304, SUS316, SUS317, SUS329, SUS410, SUS430, SUS440, and SUS630.

Examples of the Al-based alloy include an aluminum simple substance and duralumin.

As the Ti-based alloy, for example, a titanium simple substance or an alloy of titanium and a metallic element such as aluminum, vanadium, niobium, zirconium, tantalum, or molybdenum can be exemplified. Specific examples thereof include Ti-6Al-4V and Ti-6Al-7Nb. The Ti-based alloy may include a non-metallic element such as boron, carbon, nitrogen, oxygen, or silicon other than these metallic elements.

Such a metal powder may be produced by any method, but it is possible to use a metal powder produced by an atomization method (a water atomization method, a gas atomization method, a high-speed rotating water stream atomization method, and the like.), a reduction method, a carbonyl method, a grinding method, or the like.

Among these metal powders, a metal powder produced by an atomization method is preferably used. According to an atomization method, it is possible to efficiently produce a metal powder having an extremely small average particle diameter as described above. In addition, it is possible to obtain a metal powder in which a variation in particle diameter is small, and the particle diameter is uniform. Therefore, when such a metal powder is used, it is possible to reliably prevent the generation of pores in a sintered compact, and it is thereby possible to improve the density.

In addition, a metal powder produced by an atomization method has a spherical shape relatively close to a perfect sphere, and therefore, the metal powder has excellent dispersibility and fluidity with respect to the binder. Due to this, it is possible to increase a filling property when filling a granulated powder into a mold, and eventually, it is possible to obtain a denser sintered compact.

Examples of the ceramic material include oxide-based ceramic materials such as alumina, magnesia, beryllia, zirconia, yttria, forsterite, steatite, wollastonite, mullite, cordierite, ferrite, sialon, and cerium oxide; and non-oxide-based ceramic materials such as silicon nitride, aluminum nitride, boron nitride, titanium nitride, silicon carbide, boron carbide, titanium carbide, and tungsten carbide, among these ceramic materials, one ceramic material or a mixture of two or more ceramic materials is used.

The average particle diameter of the inorganic powder to be used in the invention is preferably 1 μm or more and 30 μm or less, more preferably 3 μm or more and 20 μm or less, and further more preferably 3 μm or more and 10 μm or less. If the inorganic powder has an average particle diameter within the above range, it is possible to eventually produce a sufficiently dense sintered compact while avoiding significant aggregation or a decrease in compressibility when molding.

If the average particle diameter is less than the above lower limit, the inorganic powder is liable to aggregate, and the compressibility when molding may be significantly deteriorated. On the other hand, if the average particle diameter exceeds the above upper limit, an interspace between powder particles is increased in size too much, and the densification of the finally obtained sintered compact may be insufficient.

The average particle diameter is obtained by a laser diffraction method as a particle diameter when the cumulative amount of a powder on a volume basis reaches 50%.

In the case where the inorganic powder to be used in the invention is composed of an Fe-based alloy, the tap density thereof is preferably 3.5 g/cm$^3$ or more, and more preferably 3.8 g/cm$^3$ or more. If the inorganic powder has a high tap density as described above, the filling property in the interspace between the particles when molding is particularly enhanced. Due to this, it is possible to eventually obtain a particularly dense sintered compact. The tap density of the inorganic powder can be measured according to, for example, the method for measuring a tap density specified in JIS Z 2512. The specific surface area of the inorganic powder to be used in the invention is not particularly limited, but is preferably 0.15 m$^2$/g or more and 0.8 m$^2$/g or less, more preferably 0.2 m$^2$/g or more and 0.7 m$^2$/g or less, and further more preferably 0.3 m$^2$/g or more and 0.6 m$^2$/g or less. If the inorganic powder has a large specific surface area as described above, the surface activity (surface energy) is increased, and therefore, sintering can be easily achieved even by applying less energy. Therefore, when a molded body is sintered, the sintering can be achieved in a shorter time, and the shape retainability is easily enhanced. On the other hand, if the specific surface area exceeds the above upper limit, a contact area between the inorganic powder and the binder is increased more than necessary, and the stability and fluidity of the composition for injection molding may be deteriorated. The specific surface area of the inorganic powder can be measured according to, for example, the method for measuring a specific surface area of a powder (solid) by gas adsorption specified in JIS Z 8830.

Binder

Next, the binder to be used in the invention will be described in detail.

As described above, the binder to be used in the invention contains a polyacetal-based resin and a glycidyl group-containing polymer whose content is smaller than the polyacetal-based resin.

Polyacetal-based Resin

The polyacetal-based resin is a polymer having an oxymethylene structure as a unit structure and may be a homopolymer containing only formaldehyde as a monomer, a copolymer containing formaldehyde and a monomer other than formaldehyde, or the like. Examples of the monomer (comonomer) other than formaldehyde include oxyalkylenes such as oxyethylene and oxypropylene, and also include epichlorohydrin, 1,3-dioxolane, diethylene glycol formal, 1,4-butanediol formal, and 1,3-dioxane, and particularly a monomer having an oxyalkylene unit having 2 or more carbon atoms per molecule is preferably used. The copolymerization amount of the comonomer is not particularly limited, but is preferably 1 part by mole or more and 10 parts by mole or less, and more preferably 1 part by mole or more and 6 parts by mole or less with respect to 100 parts by mole of the main monomer. The monomer sequence in such a copolymer is not particularly limited, and any of random copolymerization, alternating copolymerization, block copolymerization, and graft copolymerization may be used.

As such a polyacetal-based resin, for example, Delrin manufactured by Du Pont, Inc., Duracon manufactured by Polyplastics Co., Ltd., Tenac manufactured by Asahi Kasei Chemicals Corporation, Iupital manufactured by Mitsubishi Engineering-Plastics Corporation, Polypenco Acetal manufactured by Quadrant Polypenco Japan Ltd., Amilus manufactured by Toray Industries, Inc., or the like can be used. Further, the polyacetal-based resin has a tensile strength of preferably about 30 MPa or more and 90 MPa or less, and more preferably about 40 MPa or more and 80 MPa or less. If the polyacetal-based resin has a tensile strength within the above range, the shape retainability of the molded body after molding can be particularly enhanced.

Glycidyl Group-Containing Polymer

The glycidyl group-containing polymer is a resin to be added in a smaller amount than the polyacetal-based resin, and a polymer containing a glycidyl group such as an epoxy group is used, and a polymer containing an unsaturated glycidyl group is preferably used. The unsaturated glycidyl group-containing polymer is a polymer containing an unsaturated glycidyl group-containing monomer as a unit structure, and examples of the unsaturated glycidyl group-containing monomer include glycidyl(meth)acrylate, allyglycidyl ether, α-ethylglycidyl ether, crotonylglycidyl ether, glycidyl crotonate, an itaconic acid monoalkyl ester monoglycidyl ester, a fumaric acid monoalkyl ester monoglycidyl ester, a maleic acid monoalkyl ester monoglycidyl ester, and an alicyclic epoxy group-containing (meth)acrylate. As the glycidyl group-containing polymer, a compound containing one or more of these unit structures is used. In particular, glycidyl (meth)acrylate is preferably used. The glycidyl group contained in the glycidyl group-containing polymer is ring-opened during kneading and molding, and binds to a hydroxy group on the surfaces of the inorganic powder particles. As a result, high adhesiveness is exhibited between the inorganic powder and the glycidyl group-containing polymer, resulting in stably forming the inner layer 21.

The unsaturated glycidyl group-containing polymer is preferably a copolymer containing an unsaturated glycidyl group-containing monomer and an ethylenically unsaturated ester compound monomer as described above. A copolymer containing an ethylenically unsaturated ester compound monomer as a unit structure contributes to the realization of the composition for injection molding capable of forming a molded body having high shape retainability. In particular, the ethylenically unsaturated ester compound monomer contributes to the affinity for the inorganic powder particles along with the unsaturated glycidyl group-containing monomer, and therefore, the glycidyl group-containing polymer reliably functions as a partition which separates the inorganic powder particle from the polyacetal-based resin. Eventually, it is possible to produce a sintered compact which is particularly less deformed, chipped, or the like and has high quality.

Examples of the ethylenically unsaturated ester compound monomer include carboxylic acid vinyl esters such as vinyl acetate, vinyl propionate, methyl acrylate, ethyl acrylate, butyl acrylate, methyl methacrylate, ethyl methacrylate, and butyl methacrylate; and α,β-unsaturated carboxylic acid alkyl esters, and an unsaturated glycidyl group-containing polymer containing one or more of these ethylenically unsaturated ester compound monomers is used.

In particular, an unsaturated glycidyl group-containing polymer containing at least one of vinyl acetate and methyl acrylate among these ethylenically unsaturated ester compound monomers is preferably used.

The unsaturated glycidyl group-containing polymer preferably contains a nonpolar α-olefin-based monomer other than the unsaturated glycidyl group-containing monomer as described above. By incorporating such a nonpolar α-olefin-based monomer as a unit structure, the glycidyl group-containing polymer has high affinity for the polyacetal-based resin. As a result, the glycidyl group-containing polymer has affinity not only for the inorganic powder particle as described above, but also for the polyacetal-based resin, and therefore can exist stably between the inorganic powder particle and the polyacetal-based resin. Consequently, a decrease in shape retainability of the molded body can be particularly suppressed.

Examples of the nonpolar α-olefin-based monomer include ethylene, propylene, butene-1, hexene-1, octene-1, and 4-methylpentene-1, and among these, ethylene, propylene, butene-1, hexene-1, and octene-1 are preferred.

Since the inner layer 21 composed mainly of the glycidyl group-containing polymer is provided on the side of the particle 2, the inner layer 21 is required to have an ability to resist the above-described catalytic activity, and on the other hand, the outer layer 22 is required to have an excellent decomposability although the outer layer 22 has a higher melting point than the inner layer 21 and has high rigidity. By using the polyacetal-based resin and the unsaturated glycidyl group-containing polymer, the kneaded material 1 which satisfies these requirements can be obtained.

Further, since the unsaturated glycidyl group-containing polymer has an excellent blocking property against the catalytic activity of the metallic element and excellent compatibility with the polyacetal-based resin, the moldability can be further enhanced. Accordingly, both the shape retainability and the moldability can be achieved.

The amount of the glycidyl group-containing polymer in the composition for injection molding is set to preferably 1% by mass or more and 30% by mass or less, and more preferably 2% by mass or more and 20% by mass or less with respect to the amount of the polyacetal-based resin. By setting the amount of the glycidyl group-containing polymer in the above range, both the shape retainability and the moldability can be more highly achieved.

The melting point of the glycidyl group-containing polymer is preferably 65° C. or higher and 105° C. or lower, and more preferably 70° C. or higher and 100° C. or lower. According to this, when kneading or molding the composition for injection molding, the glycidyl group-containing polymer can be reliably melted, whereby the inner layer 21 can be formed.

A difference in melting point between the glycidyl group-containing polymer and the polyacetal-based resin is preferably 55° C. or more and 120° C. or less, and more preferably 60° C. or more and 115° C. or less. If the difference in melting point between the glycidyl group-containing polymer and the polyacetal-based resin is within the above range, both the shape retainability and the moldability can be more highly achieved.

In the glycidyl group-containing polymer, as a unit structure constituting the unsaturated glycidyl group-containing polymer, as described above, an unsaturated glycidyl group-containing monomer is used, and if necessary, an ethylenically unsaturated ester compound monomer, a nonpolar α-olefin-based monomer, or the like is used.

The abundance ratios of these components are not particularly limited, however, for example, with respect to 100 parts by mass of the unsaturated glycidyl group-containing monomer, the amount of the nonpolar α-olefin-based monomer is preferably 300 parts by mass or more and 2,000 parts by mass or less, and more preferably 400 parts by mass or more and 1,500 parts by mass or less. According to this, a balance between the compatibility with the polyacetal-based resin attributed to the nonpolar α-olefin-based monomer and the affinity for the particle 2 attributed to the unsaturated glycidyl group-containing monomer can be highly achieved, and therefore, both the shape retainability and the moldability can be particularly enhanced.

In addition, with respect to 100 parts by mass of the unsaturated glycidyl group-containing monomer, the amount of the ethylenically unsaturated ester compound monomer is preferably 20 parts by mass or more and 80 parts by mass or less, and more preferably 25 parts by mass or more and 75 parts by mass or less.

The melt flow rate of the glycidyl group-containing polymer is preferably about 0.5 g/10 min or more and 50 g/10 min or less, and more preferably about 3 g/10 min or more and 40 g/10 min or less. If the melt flow rate is within the above range, the inner layer 21 is reliably formed, and therefore, the shape retainability of the composition for injection molding is particularly improved. The melt flow rate can be measured at a temperature of 190° C. under a load of 2.16 kg according to the method specified in JIS K 6922-2.

The tensile strength of the glycidyl group-containing polymer is preferably about 4 MPa or more and 25 MPa or less, and more preferably about 5 MPa or more and 20 MPa or less. According to this, the glycidyl group-containing polymer has high fluidity also when melting, and therefore, the inner layer 21 can be more reliably formed.

The weight average molecular weight of the glycidyl group-containing polymer is appropriately set in consideration of the melt flow rate as described above or the like, however, it is, for example, preferably 10,000 or more and 400,000 or less, and more preferably 30,000 or more and 300,000 or less.

Lubricant

The binder to be used in the invention may contain a lubricant in addition to the polyacetal-based resin and the glycidyl group-containing polymer. By adding a lubricant to the composition for injection molding, the uniformity when kneading is improved because the lubricant is melted prior to the other components when kneading. This is because the polyacetal-based resin, which is the main material of the binder, is originally a resin material having low compatibility with the other binder components or inorganic powder, and compatibility is given to the polyacetal-based resin by the interposition of the lubricant. As a result, even if the shape of the inorganic powder particle is warped, the inorganic powder and the binder are uniformly mixed, and as described above, the glycidyl group-containing polymer reliably penetrates between the inorganic powder particle and the polyacetal-based resin. Further, the fluidity of the composition for injection molding is improved, and therefore, the shape transferability and the releasability are improved, and also the uniformity of the molded body is improved. As a result, the moldability of the molded body is improved.

Examples of the lubricant include a wax, a higher fatty acid, an alcohol, a fatty acid metal salt, a nonionic surfactant, and a silicone-based lubricant, and among these lubricants, one lubricant or a mixture of two or more lubricants is used.

Examples of the wax include natural waxes including vegetable waxes such as candelilla wax, carnauba wax, rice wax, Japan wax, and jojoba oil; animal waxes such as beeswax, lanolin, and spermaceti wax; mineral waxes such as montan wax, ozokerite, and ceresin; and petroleum-based waxes such as paraffin wax, microcrystalline wax, and petrolatum; and synthetic waxes including synthetic hydrocarbons such as polyethylene wax; modified waxes such as montan wax derivatives, paraffin wax derivatives, and microcrystalline wax derivatives; hydrogenated waxes such as hydrogenated castor oil and hydrogenated castor oil derivatives; fatty acids such as 12-hydroxystearic acid; acid amides such as stearic acid amide; and esters such as phthalic anhydride imide. Among these waxes, one wax can be used or two or more waxes can be used in combination.

Examples of the higher fatty acid include stearic acid, oleic acid, and linoleic acid, and particularly, a saturated fatty acid such as lauric acid, myristic acid, palmitic acid, stearic acid, or arachidic acid is preferably used.

Examples of the alcohol include polyhydric alcohols, polyglycol, and polyglycerol, and particularly, cetyl alcohol, stearyl alcohol, oleyl alcohol, mannitol, or the like is preferably used.

Examples of the fatty acid metal salt include compounds composed of a higher fatty acid such as lauric acid, stearic acid, succinic acid, stearyl lactic acid, lactic acid, phthalic acid, benzoic acid, hydroxystearic acid, ricinoleic acid, naphthenic acid, oleic acid, palmitic acid, or erucic acid and a metal such as Li, Na, Mg, Ca, Sr, Ba, Zn, Cd, Al, Sn, or Pb and particularly, magnesium stearate, calcium stearate, sodium stearate, zinc stearate, calcium oleate, zinc oleate, magnesium oleate, or the like is preferably used.

Examples of the nonionic surfactant-based lubricant include Electrostripper TS-2 and Electrostripper TS-3 (Kao Corporation).

Examples of the silicone-based lubricant include dimethylpolysiloxanes and modified products thereof, carboxyl-modified silicones, α-methylstyrene-modified silicones, α-olefin-modified silicones, polyether-modified silicones, fluorine-modified silicones, specially modified hydrophilic silicones, olefin polyether-modified silicones, epoxy-modified silicones, amino-modified silicones, amide-modified silicones, and alcohol-modified silicones.

It is preferred that among these lubricants, at least one of a wax and a saturated fatty acid is contained. By incorporating a wax, the uniformity of the composition for injection molding when kneading is further enhanced. As a result, the inorganic powder and the binder are more uniformly mixed. Further, the fluidity of the composition for injection molding is further improved, and therefore, also the moldability is further improved. In addition, a saturated fatty acid contains a long-chain alkyl group, but does not contain an unsaturated bond, and therefore functions as an excellent lubricant and can further enhance the moldability of the composition for injection molding.

As the wax, particularly, a petroleum-based wax or a modified product thereof is preferably used, and paraffin wax, microcrystalline wax, carnauba wax, or a derivative thereof is more preferably used, and paraffin wax or carnauba wax is further more preferably used. Such a wax has excellent compatibility with the polyacetal-based resin, and therefore enables the preparation of a homogeneous binder.

The weight average molecular weight of the wax is preferably 100 or more and less than 10,000, and more preferably 200 or more and 5,000 or less. By setting the weight average molecular weight of the wax within the above range, the inorganic powder and the binder can be more uniformly mixed, and therefore, the moldability of the composition for injection molding can be further enhanced.

The number of carbon atoms in the saturated fatty acid is preferably about 12 or more and 20 or less. According to this, the moldability can be particularly enhanced.

The content of the lubricant in the binder is preferably 0.1% by mass or more and 20% by mass or less, and more preferably 1% by mass or more and 15% by mass or less. By setting the content of the lubricant within the above range, the fluidity of the composition for injection molding can be particularly increased.

The ratio of the lubricant to the glycidyl group-containing polymer is preferably 0.01 or more and 0.8 or less, and more preferably 0.02 or more and 0.6 or less. By setting the ratio of the lubricant to the glycidyl group-containing polymer within the above range, a balance between the glycidyl group-containing polymer and the lubricant is optimized, and therefore, the moldability can be enhanced without impairing the shape retainability when degreasing.

Since the lubricant has a lower melting point than the glycidyl group-containing polymer, when molding is performed at the above-described temperature, the lubricant is melted to further enhance the penetrability of the glycidyl group-containing polymer and also enhance the fluidity of the polyacetal-based resin. As a result, the both the shape retainability and the moldability can be more highly achieved. The melting point of the lubricant is preferably lower than that of the polyacetal-based resin or the glycidyl group-containing polymer, and a difference in melting point between the lubricant and the glycidyl group-containing polymer is preferably 3° C. or more and 70° C. or less, and more preferably 5° C. or more and 50° C. or less. If the difference in melting point between the lubricant and the glycidyl group-containing polymer is within the above range, both the shape retainability and the moldability can be more highly achieved.

As the lubricant, a lubricant having a melting point of 30° C. or higher and 100° C. or lower is preferably used, and a lubricant having a melting point of 50° C. or higher and 95° C. or lower is more preferably used.

When a wax is contained as the lubricant, it is preferred to contain plural types of waxes having different melting points. According to this, the moldability of the composition for injection molding can be enhanced. In this case, a difference in melting point between a wax having the highest melting point and a wax having the lowest melting point is not particularly limited, but is preferably about 3° C. or more and 40° C. or less, and more preferably about 5° C. or more and 30° C. or less. Examples of a specific combination include a combination of paraffin wax and carnauba wax or the like.

Another Component

The binder to be used in the invention may contain another component.

Examples of the another component include fatty acid esters such as palm oil; phthalic acid esters such as diethyl phthalate and dibutyl phathalate; adipic acid esters such as dibutyl adipate; sebacic acid esters such as dibutyl sebacate; polyvinyl alcohol, polyvinylpyrrolidone, polyether, polypropylene carbonate, ethylenebisstearamide, sodium alginate, agar, gum arabic, resins, sucrose, and ethylene-vinyl acetate copolymers (EVA). Among these components, one component can be used or two or more components can be used in combination.

The content of the another component in the binder is preferably 0.1% by mass or more and 10% by mass or less, and more preferably 1% by mass or more and 8% by mass or less.

The ratio of the another component to the glycidyl group-containing polymer is preferably 0.005 or more and 0.3 or less, and more preferably 0.01 or more and 0.2 or less.

Further additional examples of the another component include polyolefins such as polyethylene, polypropylene, polybutylene, and polypentene; polyolefin-based copolymers such as a polyethylene-polypropylene copolymer and a polyethylene-polybutylene copolymer; and hydrocarbon-based resins such as polystyrene.

The composition for injection molding may further contain an antioxidant, a degreasing accelerating agent, a surfactant, or the like other than the above-described components.

The content of the binder in the composition for injection molding is appropriately set according to the metal powder or the ceramic powder, however, it is set to preferably about 1 part by mass or more and 50 parts by mass or less, and more preferably about 3 parts by mass or more and 30 parts by mass or less with respect to 100 parts by mass of the inorganic powder. According to this, the shape retainability of the composition for injection molding particularly when degreasing is enhanced.

By using the inorganic powder and the binder as described above, the kneaded material 1 (composition for injection molding of the embodiment of the invention) is obtained through the respective steps as described above.

The thus obtained kneaded material 1 is subjected to the below-described molding step, decreasing step, and firing step, whereby a sintered compact is formed. Hereinafter, the respective steps will be described.

Molding Step

The thus obtained kneaded material is molded, whereby a molded body having a desired shape and dimension is produced.

As the molding method, an injection molding method is used. Incidentally, prior to injection molding, the composition for injection molding may be subjected to a pelletization treatment as needed. The pelletization treatment is a treatment in which a compound is ground using a grinding device such as a pelletizer. The thus obtained pellets have an average particle diameter of about 1 mm or more and 10 mm or less. Then, the thus obtained pellets are placed in an injection molding machine and injected into a mold to effect molding. According to this, a molded body to which the shape of the mold has been transferred is obtained.

The shape and dimension of the molded body to be produced are determined in anticipation of the amount of shrinkage by degreasing and sintering to be performed thereafter.

The resulting molded body may be subjected to post-processing such as mechanical processing or laser processing as needed. In the molding step, the material temperature is preferably about 80° C. or higher and 210° C. or lower, and the injection pressure is preferably about 50 MPa or more and 500 MPa or less (0.5 t/cm$^2$ or more and 5 t/cm$^2$ or less).

Degreasing Step

Subsequently, the thus obtained molded body is subjected to a degreasing treatment. According to this, the binder contained in the molded body is removed (degreased), whereby a degreased body is obtained.

The lubricant is decomposed and discharged outside before the polyacetal-based resin and the glycidyl group-containing polymer when degreasing or molding prior to degreasing in many cases. At this time, a flow path is formed in the molded body. In the degreasing step, decomposed products of the polyacetal-based resin and the glycidyl group-containing polymer are easily discharged through this flow path, and therefore, a degreasing treatment can be performed while preventing the occurrence of a crack or the like in the molded body. As a result, the shape retainability of the molded body (degreased body) can be particularly enhanced.

The degreasing treatment is not particularly limited, but is performed by a heat treatment in an oxidative atmosphere such as oxygen gas or nitric acid gas, and other than this, in a non-oxidative atmosphere, for example, under vacuum or a reduced pressure (for example, $1.33 \times 10^{-4}$ Pa or more and 13.3 Pa or less), or in a gas such as nitrogen gas or argon gas. The treatment temperature in the degreasing step (heat treatment) is not particularly limited, but is preferably 100° C. or higher and 750° C. or lower, and more preferably 150° C. or higher and 700° C. or lower.

The treatment time (heat treatment time) in the degreasing step (heat treatment) is preferably 0.5 hours or more and 20 hours or less, and more preferably 1 hour or more and 10 hours or less.

The degreasing by such a heat treatment may be performed by being divided into a plurality of steps (stages) for various purposes (for example, for the purpose of reducing the degreasing time, and the like.). In this case, for example, a method in which degreasing is performed at a low temperature in the former half and at a high temperature in the latter half, a method in which degreasing at a low temperature and degreasing at a high temperature are alternately repeated, or the like can be used.

After the degreasing treatment as described above, the thus obtained degreased body may be subjected to various post-processing treatments for the purpose of, for example, deburring, forming a microstructure such as a groove, and the like.

It is not necessary to completely remove the binder in the molded body by the degreasing treatment, and for example, the binder may partially remain therein at the time of completion of the degreasing treatment.

Firing Step

Subsequently, the degreased body having been subjected to the degreasing treatment is fired. According to this, the degreased body is sintered, whereby a sintered compact is obtained.

The firing conditions are not particularly limited, but the firing step is performed by a heat treatment in a non-oxidative atmosphere, for example, under vacuum or a reduced pressure (for example, $1.33 \times 10^{-4}$ Pa or more and 133 Pa or less), or in an inert gas such as nitrogen gas or argon gas. According to this, the oxidation of the metal powder can be prevented. In the case where a metal material is contained in the inorganic powder, it is preferred that when firing, the degreased body is placed in a vessel composed of a metal material of the same type as the metal material contained in the inorganic powder, and the degreased body is fired in such a state. According to this, the metal component in the degreased body is hardly evaporated, and therefore, the metal composition of the finally obtained sintered compact can be prevented from deviating from the intended composition.

As the vessel to be used, not a vessel having an airtight structure, but a vessel having an appropriate pore or aperture is preferred. According to this, the atmosphere in the inside of the vessel is made the same as that in the outside of the vessel, and can be prevented from changing to an undesired atmosphere. Further, it is preferred that there is a sufficient space between the vessel and the degreased body without adhering to each other as much as possible.

The atmosphere in which the firing step is performed may be changed in the course of the firing step. For example, the initial firing atmosphere is set to a reduced pressure atmosphere, and then, the atmosphere can be changed to an inert gas atmosphere in the course of the firing step.

The firing step may be performed by being divided into two or more stages. According to this, sintering efficiency is improved, and sintering can be achieved in a shorter firing time.

It is preferred that the firing step is performed continuously with the above-described degreasing step. According to this, the degreasing step can also serve as a pre-sintering step, and therefore, preheating is provided for the degreased body and the degreased body can be more reliably sintered.

The firing temperature is appropriately set according to the type of the inorganic powder. However, in the case of the metal powder, the firing temperature is preferably 1,000° C. or higher and 1,650° C. or lower, and more preferably 1,050° C. or higher and 1,500° C. or lower. Meanwhile in the case of the ceramic powder, the firing temperature is preferably 1,250° C. or higher and 1,900° C. or lower, and more preferably 1,300° C. or higher and 1,800° C. or lower.

The firing time is preferably 0.5 hours or more and 20 hours or less, and more preferably 1 hour or more and 15 hours or less.

Such a firing step may be performed by being divided into a plurality of steps (stages) for various purposes (for example, for the purpose of reducing the firing time). In this case, for example, a method in which firing is performed at a low temperature in the former half and at a high temperature in the latter half, a method in which firing at a low temperature and firing at a high temperature are alternately repeated, or the like can be used.

After the firing step as described above, the thus obtained sintered compact may be subjected to mechanical processing, electric discharge processing, laser processing, etching, or the like for the purpose of, for example, deburring, forming a microstructure such as a groove, or the like.

The obtained sintered compact may be subjected to an HIP treatment (hot isostatic press treatment) or the like. as needed. According to this, the density of the sintered compact can be further increased.

As for the conditions for the HIP treatment, for example, the temperature is set to 850° C. or higher and 1,100° C. or lower, and the time is set to 1 hour or more and 10 hours or less.

Further, the pressure to be applied is preferably 50 MPa or more, and more preferably 100 MPa or more.

The sintered compact obtained as described above may be used in any purpose, and as the use thereof, various structural parts, various medical structures, and the like can be exemplified. The relative density of the thus obtained sintered compact is expected to be, for example, 95% or more, preferably 96% or more. Such a sintered compact has a high sintering density and has excellent appearance and dimensional accuracy.

Further, the tensile strength of the sintered compact is expected to be, for example, 900 MPa or more in the case of using a metal powder. In addition, the 0.2% proof stress of the sintered compact is expected to be, for example, 750 MPa or more in the case of using a metal powder.

Hereinabove, the invention is described based on preferred embodiments, however, the invention is not limited thereto.

EXAMPLES

Next, specific Examples of the invention will be described.
1. Production of Sintered Compact Example 1

First, an SUS316L powder (powder No. 1) produced by a water atomization method was prepared. The average particle diameter of the SUS316L powder was measured using a laser diffraction particle size distribution analyzer (Microtrac HRA 9320-X100, manufactured by Nikkiso Co., Ltd.). The measured value is shown in Table 1.

TABLE 1

| | Formulation | Average particle diameter [μm] | Amount of binder with respect to 100 parts by mass of powder (parts by mass) |
|---|---|---|---|
| Powder No. 1 | SUS316L | 10 | 10 |
| Powder No. 2 | 2%Ni—Fe | 6 | 9 |
| Powder No. 3 | Ti—6Al—4V | 17 | 11 |
| Powder No. 4 | Alumina | 0.5 | 30 |

On the other hand, a binder having a formulation shown in Table 2 was prepared, and a first resin, a second resin and the like (including a lubricant and another component) were separately cryogenically ground. By doing this, a first powder obtained by cryogenically grinding the first resin, a second powder obtained by cryogenically grinding the second resin and the like were separately produced.

Specifically, the first resin was placed in a grinding vessel and ground while cooling with liquid nitrogen. The average particle diameter of the obtained first powder was 53 μm.

Also, the average particle diameter of the second powder was 242 μm. Subsequently, the SUS316L powder, the first powder, and the second powder were mixed using a V-type mixing machine, and the resulting mixture was kneaded using a pressure kneader (kneading machine) at a kneading temperature of 160° C. for 30 minutes. This kneading was performed in a nitrogen atmosphere. The mixing ratio of the SUS316L powder and the binder is shown in Table 1.

Subsequently, the thus obtained kneaded material was ground using a pelletizer, whereby pellets having an average particle diameter of 5 mm were obtained.

Then, the thus obtained pellets were molded by an injection molding machine under the molding conditions that the material temperature was 190° C. and the injection pressure was 10.8 MPa (110 kgf/cm$^2$). By doing this, a molded body was obtained. The molded body had a cylindrical shape with a diameter of 0.5 mm and a height of 0.5 mm.

Subsequently, the molded body was subjected to a degreasing treatment under the degreasing conditions that the temperature was 500° C., the time was 1 hour, and the atmosphere was nitrogen gas (atmospheric pressure). By doing this, a degreased body was obtained.

Subsequently, the degreased body was subjected to a firing treatment under the firing conditions that the temperature was 1,270° C., the time was 3 hours, and the atmosphere was nitrogen gas (atmospheric pressure). By doing this, a sintered compact was obtained.

Examples 2 to 19

Sintered compacts were obtained in the same manner as in Example 1 except that a binder having a formulation shown in Table 2 was used as the binder.

Incidentally, in Example 15, the kneading temperature was set to 155° C. In the Examples, the average particle diameter of the first powder was about 40 μm or more and 70 μm or less, and the average particle diameter of the second powder was about 180 μm or more and 300 μm or less.

In Example 10, as the first resin, a mixture of Tenac HC750 and stearyl alcohol was used, and as the second resin, a mixture of E-GA and paraffin wax was used.

TABLE 2

| Classification | Component | Melting point (softening point) | Unit | Example 1 | Example 2 | Example 3 | Example 4 | Example 5 | Example 6 | Example 7 | Example 8 |
|---|---|---|---|---|---|---|---|---|---|---|---|
| Binder | First resin | Tenac HC750 | 170° C. | % by mass | 96 | 94 | 92 | 87 | 81 | 77 | 70 | 82 |
| | | Tenac 7520 | 160° C. | % by mass | | | | | | | | |
| | | Tenac 7054 | 165° C. | % by mass | | | | | | | | |
| | Second resin | E-GMA-VA | 95° C. | % by mass | 1 | 3 | 5 | 10 | 15 | 20 | 25 | |
| | | E-GMA-MA | 52° C. | % by mass | | | | | | | | 12 |
| | | E-GMA | 103° C. | % by mass | | | | | | | | |
| | | E-GA | 50° C. | % by mass | | | | | | | | |
| | Lubricant | Paraffin wax | 60° C. | % by mass | | | | | 1 | 1 | | 2 |
| | | Microcrystalline wax | 70° C. | % by mass | | | | | | | 1 | |
| | | Polyethylene wax | 110° C. | % by mass | | | | | | | 1 | |
| | | Carnauba wax | 80° C. | % by mass | | | | | | | | |
| | | Stearic acid | 70° C. | % by mass | 2 | 2 | 2 | 1 | 2 | 1 | 3 | 2 |
| | | Stearyl alcohol | 60° C. | % by mass | | | | | | | | |
| | Other | Dibutyl phthalate | — | % by mass | | | | | | | | 1 |
| | | Irganox 245 | — | % by mass | 1 | 1 | 1 | 1 | 1 | 1 | 1 | 1 |
| | | EVA | 45° C. | % by mass | | | | | | | | |
| | | Polystyrene | — | % by mass | | | | | | | | |
| | | Second resin/First resin × 100 | — | % by mass | 1.0 | 3.2 | 5.4 | 11.5 | 18.5 | 26.0 | 35.7 | 14.6 |
| | | Lubricant/Second resin | — | — | 2.00 | 0.67 | 0.40 | 0.20 | 0.20 | 0.10 | 0.16 | 0.33 |
| | | Grinding method for first powder | — | — | Cryogenic grinding | Cryogenic grinding | Cryogenic grinding | Cryogenic grinding | Cryogenic grinding | Cryogenic grinding | Cryogenic grinding | Cryogenic grinding |

TABLE 2-continued

| | | | | | | | | | | | |
|---|---|---|---|---|---|---|---|---|---|---|---|
| | Grinding method for second powder | — | — | Cryogenic grinding No. 1 | Cryogenic grinding No. 1 | Cryogenic grinding No. 1 | Cryogenic grinding No. 1 | Cryogenic grinding No. 1 | Cryogenic grinding No. 1 | Cryogenic grinding No. 1 | Cryogenic grinding No. 1 |
| Inorganic powder | Metal powder | — | — | No. 1 | No. 1 | No. 1 | No. 1 | No. 1 | No. 1 | No. 1 | No. 1 |
| Evaluation results of kneaded material | Viscosity | — | P | 3900 | 3700 | 3400 | 4800 | 3200 | 3900 | 5300 | 5400 |
| | Amount of generated formaldehyde | — | ppm | 0.45 | 0.23 | 0.09 | 0.05 | 0.04 | 0.03 | 0.02 | 0.06 |
| Evaluation results of sintered compact | Sintering density | — | — | 97.3 | 97.8 | 98.1 | 98.4 | 98.2 | 97.6 | 96.8 | 96.7 |
| | Appearance | — | — | C | A | A | A | A | A | B | B |
| | Dimensional accuracy | — | — | B | B | A | A | A | B | B | B |

| Classification | Component | Melting point (softening point) | Unit | Example 9 | Example 10 | Example 11 | Example 12 | Example 13 | Example 14 | Example 15 | Example 16 |
|---|---|---|---|---|---|---|---|---|---|---|---|
| Binder | First resin | | | | | | | | | | |
| | Tenac HC750 | 170° C. | % by mass | 72 | 79 | 87 | 84 | 88 | 86 | | |
| | Tenac 7520 | 160° C. | % by mass | | | | | | | 89 | |
| | Tenac 7054 | 165° C. | % by mass | | | | | | | | 84 |
| | Second resin | | | | | | | | | | |
| | E-GMA-VA | 95° C. | % by mass | | | 8 | 10 | 10 | 10 | | |
| | E-GMA-MA | 52° C. | % by mass | | | | 2 | 1 | | 8 | 3 |
| | E-GMA | 103° C. | % by mass | 17 | | | | | | | 7 |
| | E-GA | 50° C. | % by mass | | 15 | | | | | | |
| | Lubricant | | | | | | | | | | |
| | Paraffin wax | 60° C. | % by mass | 3 | 4 | | 1 | | 1 | | 2 |
| | Microcrystalline wax | 70° C. | % by mass | | | | | 1 | | | |
| | Polyethylene wax | 110° C. | % by mass | | | | | | | | |
| | Carnauba wax | 80° C. | % by mass | | | | | | 1 | | |
| | Stearic acid | 70° C. | % by mass | 5 | | 2 | 2 | 1 | 1 | 2 | 3 |
| | Stearyl alcohol | 60° C. | % by mass | | 1 | | | | | | |
| | Other | | | | | | | | | | |
| | Dibutyl phthalate | — | % by mass | | | | | | | | |
| | Irganox 245 | — | % by mass | 1 | 1 | 1 | 1 | 1 | 1 | 1 | 1 |
| | EVA | 45° C. | % by mass | 2 | | | | | | | |
| | Polystyrene | — | % by mass | | | | | | | | |
| | Second resin/First resin × 100 | — | % by mass | 23.6 | 19.0 | 11.5 | 13.1 | 11.4 | 11.6 | 9.0 | 11.9 |
| | Lubricant/Second resin | — | — | 0.47 | 0.27 | 0.20 | 0.36 | 0.10 | 0.30 | 0.25 | 0.50 |
| | Grinding method for first powder | — | — | Cryogenic grinding | Cryogenic grinding | Cryogenic grinding | Cryogenic grinding | Cryogenic grinding | Cryogenic grinding | Cryogenic grinding | Cryogenic grinding |
| | Grinding method for second powder | — | — | Cryogenic grinding | Cryogenic grinding | Cryogenic grinding | Cryogenic grinding | Cryogenic grinding | Cryogenic grinding | Cryogenic grinding | Cryogenic grinding |
| Inorganic powder | Metal powder | — | — | No. 1 | No. 1 | No. 1 | No. 1 | No. 1 | No. 1 | No. 1 | No. 1 |
| Evaluation results of kneaded material | Viscosity | — | P | 5500 | 5200 | 3300 | 3400 | 4500 | 3200 | 4100 | 5000 |
| | Amount of generated formaldehyde | — | ppm | 0.08 | 0.24 | 0.03 | 0.02 | 0.08 | 0.04 | 0.09 | 0.15 |
| Evaluation results of sintered compact | Sintering density | — | — | 96.4 | 96.8 | 98.3 | 98.4 | 98.2 | 98.5 | 97.8 | 96.8 |
| | Appearance | — | — | B | B | A | A | A | A | B | B |
| | Dimensional accuracy | — | — | B | C | A | A | A | A | B | C |

| Classification | Component | Melting point (softening point) | Unit | Example 17 | Example 18 | Example 19 |
|---|---|---|---|---|---|---|
| Binder | First resin | | | | | |
| | Tenac HC750 | 170° C. | % by mass | 87 | 87 | 88 |
| | Tenac 7520 | 160° C. | % by mass | | | |
| | Tenac 7054 | 165° C. | % by mass | | | |
| | Second resin | | | | | |
| | E-GMA-VA | 95° C. | % by mass | | | 10 |
| | E-GMA-MA | 52° C. | % by mass | 10 | 8 | |
| | E-GMA | 103° C. | % by mass | | | |
| | E-GA | 50° C. | % by mass | | | |
| | Lubricant | | | | | |
| | Paraffin wax | 60° C. | % by mass | 1 | 1 | |
| | Microcrystalline wax | 70° C. | % by mass | | | |
| | Polyethylene wax | 110° C. | % by mass | | | |
| | Carnauba wax | 80° C. | % by mass | 1 | 1 | |
| | Stearic acid | 70° C. | % by mass | | 1 | 1 |
| | Stearyl alcohol | 60° C. | % by mass | 1 | | |
| | Other | | | | | |
| | Dibutyl phthalate | — | % by mass | | 1 | |
| | Irganox 245 | — | % by mass | 1 | | |
| | EVA | 45° C. | % by mass | | | |
| | Polystyrene | — | % by mass | | | |
| | Second resin/First resin × 100 | — | — | 11.5 | 9.2 | 11.4 |
| | Lubricant/Second resin | — | — | 0.20 | 0.38 | 0.10 |
| | Grinding method for first powder | — | — | Cryogenic grinding | Cryogenic grinding | Cryogenic grinding |
| | Grinding method for second powder | — | — | Cryogenic grinding | Cryogenic grinding | Cryogenic grinding |

TABLE 2-continued

| | | | | | | |
|---|---|---|---|---|---|---|
| Inorganic powder | Metal powder | — | — | No. 1 | No. 1 | No. 1 |
| Evaluation results of kneaded material | Viscosity | — | P | 5800 | 3500 | 4500 |
| | Amount of generated formaldehyde | — | ppm | 0.13 | 0.18 | 0.08 |
| Evaluation results of sintered compact | Sintering density | — | — | 96.9 | 97.2 | 98.2 |
| | Appearance | — | — | C | A | A |
| | Dimensional accuracy | — | — | B | B | A |

E-GMA indicates that an ethylene structure and a glycidyl methacrylate structure are contained.
E-GA indicates that an ethylene structure and a glycidyl acrylate structure are contained.
VA indicates that a vinyl acetate structure is contained, and MA indicates that a methyl acrylate structure is contained.

Comparative Examples 1 to 6

Sintered compacts were obtained in the same manner as in Example 1 except that the powder No. 1 was used as the inorganic powder and a binder having a formulation shown in Table 3 was used as the binder.

The first resin and the second resin in Tables 2 and 3 shown above and Tables 4 to 6 shown below are the following compounds.

First Resin
  Tenac HC750: a polyacetal-based copolymer
  Tenac 7520: a polyacetal-based copolymer
  Tenac 7054: a polyacetal-based homopolymer
Second Resin
  E-GMA-VA: a glycidyl methacrylate structure: 12% by mass, a vinyl acetate structure: 5% by mass, and an ethylene structure: remainder
  E-GMA-MA: a glycidyl methacrylate structure: 3% by mass, a methyl acrylate structure: 27% by mass, and an ethylene structure: remainder
  E-GMA: a glycidyl methacrylate structure: 12% by mass and an ethylene structure: remainder
  E-GA: a glycidyl acrylate structure: 12% by mass and an ethylene structure: remainder As for the melt flow rate of the second resin, E-GMA-VA, E-GMA-MA, and E-GMA had a melt flow rate of 7 g/10 min, 7 g/10 min, or 3 g/10 min, respectively.

Comparative Examples 7 and 8

Sintered compacts were obtained in the same manner as in Examples 10 or 4 except that as the first powder and the second powder in the binder, those obtained by grinding without cooling were used. The average particle diameter of the first powder was about 50 μm or more and 55 μm or less, and the average particle diameter of the second powder was about 240 μm or more and 255 μm or less.

TABLE 3

| | Classification | Component | Melting point (softening point) | Unit | Comparative Example 1 | Comparative Example 2 | Comparative Example 3 | Comparative Example 4 | Comparative Example 5 |
|---|---|---|---|---|---|---|---|---|---|
| Binder | First resin | Tenac HC750 | 170° C. | % by mass | 97 | 91 | | | |
| | | Tenac 7520 | 160° C. | % by mass | | | | | |
| | | Tenac 7054 | 165° C. | % by mass | | | | | |
| | Second resin | E-GMA-VA | 95° C. | % by mass | | | | | 10 |
| | | E-GMA-MA | 52° C. | % by mass | | | | | |
| | | E-GMA | 103° C. | % by mass | | | | | |
| | | E-GA | — | % by mass | | | | | |
| | Lubricant | Paraffin wax | 60° C. | % by mass | | 5 | 2 | 5 | 2 |
| | | Microcrystalline wax | 70° C. | % by mass | | | | | |
| | | Polyethylene wax | 110° C. | % by mass | | | | | |
| | | Carnauba wax | 80° C. | % by mass | | | | | |
| | | Stearic acid | 70° C. | % by mass | 2 | 2 | 3 | 2 | |
| | | Stearyl alcohol | 60° C. | % by mass | | | | | 2 |
| | Other | Dibutyl phthalate | — | % by mass | | 1 | | 10 | |
| | | Irganox 245 | — | % by mass | 1 | 1 | 1 | 1 | 1 |
| | EVA | | 45° C. | % by mass | | | 40 | 42 | 36 |
| | Polystyrene | | — | % by mass | | | 54 | 40 | 49 |
| | Second resin/First resin × 100 | | — | % by mass | — | — | — | — | — |
| | Lubricant/Second resin | | — | — | | | | | |
| | Grinding method for first powder | | — | — | Cryogenic grinding | Cryogenic grinding | Cryogenic grinding | Cryogenic grinding | Cryogenic grinding |
| | Grinding method for second powder | | — | — | Cryogenic grinding | Cryogenic grinding | Cryogenic grinding | Cryogenic grinding | Cryogenic grinding |
| Inorganic powder | Metal powder | | — | — | No. 1 | No. 1 | No. 1 | No. 1 | No. 1 |
| Evaluation results of kneaded material | Viscosity | | — | P | 7500 | 6900 | 6400 | 5900 | 4600 |
| | Amount of generated formaldehyde | | — | ppm | 3.25 | 1.47 | — | — | — |
| Evaluation results of sintered compact | Sintering density | | — | — | 96.1 | 96.4 | 94.5 | 95.7 | 95.4 |
| | Appearance | | — | — | D | D | D | D | C |
| | Dimensional accuracy | | — | — | D | D | D | D | D |

TABLE 3-continued

| Classification | Component | Melting point (softening point) | Unit | Comparative Example 6 | Comparative Example 7 | Comparative Example 8 |
|---|---|---|---|---|---|---|
| Binder First resin | Tenac HC750 | 170° C. | % by mass | | 88 | 87 |
| | Tenac 7520 | 160° C. | % by mass | | | |
| | Tenac 7054 | 165° C. | % by mass | | | |
| Second resin | E-GMA-VA | 95° C. | % by mass | 5 | 10 | 10 |
| | E-GMA-MA | 52° C. | % by mass | | | |
| | E-GMA | 103° C. | % by mass | | | |
| | E-GA | — | % by mass | | | |
| Lubricant | Paraffin wax | 60° C. | % by mass | 5 | | 1 |
| | Microcrystalline wax | 70° C. | % by mass | | | |
| | Polyethylene wax | 110° C. | % by mass | | | |
| | Carnauba wax | 80° C. | % by mass | | | |
| | Stearic acid | 70° C. | % by mass | 2 | 1 | 1 |
| | Stearyl alcohol | 60° C. | % by mass | | | |
| Other | Dibutyl phthalate | — | % by mass | 1 | | |
| | Irganox 245 | — | % by mass | 1 | 1 | 1 |
| EVA | | 45° C. | % by mass | 40 | | |
| Polystyrene | | — | % by mass | 46 | | |
| Second resin/First resin × 100 | | — | % by mass | — | 11.4 | 11.5 |
| Lubricant/Second resin | | — | — | — | 0.10 | 0.20 |
| Grinding method for first powder | | — | — | Cryogenic grinding | Non-cryogenic grinding | Non-cryogenic grinding |
| Grinding method for second powder | | — | — | Cryogenic grinding | Non-cryogenic grinding | Non-cryogenic grinding |
| Inorganic powder | Metal powder | — | — | No. 1 | No. 1 | No. 1 |
| Evaluation results of kneaded material | Viscosity | — | P | 4800 | 5200 | 5100 |
| | Amount of generated formaldehyde | — | ppm | — | 2.27 | 2.15 |
| Evaluation results of sintered compact | Sintering density | — | — | 96.1 | 95.2 | 95.9 |
| | Appearance | — | — | C | C | C |
| | Dimensional accuracy | — | — | D | D | D |

E-GMA indicates that an ethylene structure and a glycidyl methacrylate structure are contained.
E-GA indicates that an ethylene structure and a glycidyl acrylate structure are contained.
VA indicates that a vinyl acetate structure is contained, and MA indicates that a methyl acrylate structure is contained.

Examples 20 to 22

First, a 2% Ni—Fe alloy powder (powder No. 2) produced by a water atomization method was prepared. The average particle diameter of the powder was measured using a laser diffraction particle size distribution analyzer. The measured value is shown in Table 1. The formulation of the 2% Ni—Fe alloy is as follows: C (0.4% by mass or more and 0.6% by mass or less), Si (0.35% by mass or less), Mn (0.8% by mass or less), P (0.03% by mass or less), S (0.045% by mass or less), Ni (1.5% by mass or more and 2.5% by mass or less), Cr (0.2% by mass or less), and Fe (remainder).

Then, sintered compacts were obtained in the same manner as in Example 1 except that a binder having a formulation shown in Table 4 was used as the binder. Incidentally, the molding conditions were set such that the material temperature was 190° C. Further, the degreasing conditions were set such that the temperature was 600° C., the time was 1 hour, and the atmosphere was nitrogen gas (atmospheric pressure). Further, the firing conditions were set such that the temperature was 1,150° C., the time was 3 hours, and the atmosphere was nitrogen gas (atmospheric pressure).

Comparative Examples 9 to 12

Sintered compacts were obtained in the same manner as in Example 1 except that the powder No. 2 was used as the inorganic powder and a binder having a formulation shown in Table 4 was used as the binder.

Comparative Example 13

A sintered compact was obtained in the same manner as in Example 20 except that as the first powder and the second powder in the binder, those obtained by grinding without cooling were used.

TABLE 4

| Classification | Component | Melting point (softening point) | Unit | Example 20 | Example 21 | Example 22 | Comparative Example 9 | Comparative Example 10 |
|---|---|---|---|---|---|---|---|---|
| Binder | First resin | Tenac HC750 | 170° C. | % by mass | 86 | 86 | | 97 | 91 |
| | | Tenac 7520 | 160° C. | % by mass | | | | | |
| | | Tenac 7054 | 165° C. | % by mass | | | 82 | | |
| | Second resin | E-GMA-VA | 95° C. | % by mass | 10 | | 9 | | |
| | | E-GMA-MA | 52° C. | % by mass | | 9 | | | |
| | | E-GMA | 103° C. | % by mass | | | | | |
| | | E-GA | 50° C. | % by mass | | | | | |

TABLE 4-continued

|  |  |  | Melting point (softening point) | Unit | | | | | |
|---|---|---|---|---|---|---|---|---|---|
| | Lubricant | Paraffin wax | 60° C. | % by mass | 1 | 1 | 3 | | 5 |
| | | Microcrystalline wax | 70° C. | % by mass | | 0.5 | | | |
| | | Polyethylene wax | 110° C. | % by mass | | | | | |
| | | Carnauba wax | 80° C. | % by mass | 1 | | | | |
| | | Stearic acid | 70° C. | % by mass | 1 | 2 | 5 | 2 | 1 |
| | | Stearyl alcohol | 60° C. | % by mass | | | | | 1 |
| | Other | Dibutyl phthalate | — | % by mass | | 0.5 | | | 1 |
| | | Irganox 245 | — | % by mass | 1 | 1 | 1 | 1 | 1 |
| | EVA | | 45° C. | % by mass | | | | | |
| | Polystyrene | | — | % by mass | | | | | |
| | Second resin/First resin × 100 | | — | % by mass | 11.6 | 10.5 | 11.0 | — | — |
| | Lubricant/Second resin | | — | — | 0.30 | 0.39 | 0.89 | — | — |
| | Grinding method for first powder | | — | — | Cryogenic grinding | Cryogenic grinding | Cryogenic grinding | Cryogenic grinding | Cryogenic grinding |
| | Grinding method for second powder | | — | — | Cryogenic grinding | Cryogenic grinding | Cryogenic grinding | Cryogenic grinding | Cryogenic grinding |
| Inorganic powder | Metal powder | | — | — | No. 2 | No. 2 | No. 2 | No. 2 | No. 2 |
| Evaluation results of kneaded material | Viscosity | | — | P | 3200 | 3300 | 4700 | 7700 | 7000 |
| | Amount of generated formaldehyde | | — | ppm | 0.06 | 0.07 | 0.09 | 3.19 | 1.45 |
| Evaluation results of sintered compact | Sintering density | | — | — | 98.6 | 98.2 | 97.0 | 95.9 | 96.4 |
| | Appearance | | — | — | A | A | B | D | D |
| | Dimensional accuracy | | — | — | A | A | B | D | D |

| | Classification | Component | Melting point (softening point) | Unit | Comparative Example 11 | Comparative Example 12 | Comparative Example 13 |
|---|---|---|---|---|---|---|---|
| Binder | First resin | Tenac HC750 | 170° C. | % by mass | | | 86 |
| | | Tenac 7520 | 160° C. | % by mass | | | |
| | | Tenac 7054 | 165° C. | % by mass | | | |
| | Second resin | E-GMA-VA | 95° C. | % by mass | | 10 | 10 |
| | | E-GMA-MA | 52° C. | % by mass | | | |
| | | E-GMA | 103° C. | % by mass | | | |
| | | E-GA | 50° C. | % by mass | | | |
| | Lubricant | Paraffin wax | 60° C. | % by mass | 2 | 2 | 1 |
| | | Microcrystalline wax | 70° C. | % by mass | | | |
| | | Polyethylene wax | 110° C. | % by mass | | | |
| | | Carnauba wax | 80° C. | % by mass | | | 1 |
| | | Stearic acid | 70° C. | % by mass | 3 | 3 | 1 |
| | | Stearyl alcohol | 60° C. | % by mass | | | |
| | Other | Dibutyl phthalate | — | % by mass | | | |
| | | Irganox 245 | — | % by mass | 1 | 1 | 1 |
| | EVA | | 45° C. | % by mass | 40 | 35 | |
| | Polystyrene | | — | % by mass | 54 | 49 | |
| | Second resin/First resin × 100 | | — | % by mass | — | — | 11.6 |
| | Lubricant/Second resin | | — | — | — | — | 0.30 |
| | Grinding method for first powder | | — | — | Cryogenic grinding | Cryogenic grinding | Non-cryogenic grinding |
| | Grinding method for second powder | | — | — | Cryogenic grinding | Cryogenic grinding | Non-cryogenic grinding |
| Inorganic powder | Metal powder | | — | — | No. 2 | No. 2 | No. 2 |
| Evaluation results of kneaded material | Viscosity | | — | P | 6600 | 4900 | 4800 |
| | Amount of generated formaldehyde | | — | ppm | — | — | 1.98 |
| Evaluation results of sintered compact | Sintering density | | — | — | 94.1 | 95.2 | 94.9 |
| | Appearance | | — | — | D | C | C |
| | Dimensional accuracy | | — | — | D | D | D |

E-GMA indicates that an ethylene structure and a glycidyl methacrylate structure are contained.
E-GA indicates that an ethylene structure and a glycidyl acrylate structure are contained.
VA indicates that a vinyl acetate structure is contained, and MA indicates that a methyl acrylate structure is contained.

Examples 23 to 25

First, a Ti alloy powder (powder No. 3) produced by a gas atomization method was prepared. The average particle diameter of the powder was measured using a laser diffraction particle size distribution analyzer. The measured value is shown in Table 1.

Then, sintered compacts were obtained in the same manner as in Example 1 except that a binder having a formulation shown in Table 5 was used as the binder. Incidentally, the molding conditions were set such that the material temperature was 190° C. Further, the degreasing conditions were set such that the temperature was 450° C., the time was 1 hour, and the atmosphere was nitrogen gas (atmospheric pressure). Further, the firing conditions were set such that the temperature was 1,100° C., the time was 3 hours, and the atmosphere was argon gas (reduced pressure: 1.3 kPa).

Comparative Examples 14 to 17

Sintered compacts were obtained in the same manner as in Example 1 except that the powder No. 3 was used as the inorganic powder and a binder having a formulation shown in Table 5 was used as the binder.

Comparative Example 18

A sintered compact was obtained in the same manner as in Example 23 except that as the first powder and the second powder in the binder, those obtained by grinding without cooling were used.

TABLE 5

| Classification | Component | Melting point (softening point) | Unit | Example 23 | Example 24 | Example 25 | Comparative Example 14 | Comparative Example 15 |
|---|---|---|---|---|---|---|---|---|
| Binder | First resin | | | | | | | |
| | Tenac HC750 | 170° C. | % by mass | 86 | 86 | | 97 | 91 |
| | Tenac 7520 | 160° C. | % by mass | | | | | |
| | Tenac 7054 | 165° C. | % by mass | | | 88 | | |
| Second resin | E-GMA-VA | 95° C. | % by mass | 10 | 8 | 7 | | |
| | E-GMA-MA | 52° C. | % by mass | | | | | |
| | E-GMA | 103° C. | % by mass | | | 2 | | |
| | E-GA | 50° C. | % by mass | | | | | |
| Lubricant | Paraffin wax | 60° C. | % by mass | 1 | 1 | | | 5 |
| | Microcrystalline wax | 70° C. | % by mass | | 0.5 | 3 | | |
| | Polyethylene wax | 110° C. | % by mass | | | | | |
| | Carnauba wax | 80° C. | % by mass | 1 | | | | |
| | Stearic acid | 70° C. | % by mass | 1 | 1 | 1 | 2 | 2 |
| | Stearyl alcohol | 60° C. | % by mass | | | | | |
| Other | Dibutyl phthalate | — | % by mass | | 0.5 | | | 1 |
| | Irganox 245 | — | % by mass | 1 | 1 | 1 | 1 | 1 |
| EVA | | 45° C. | % by mass | | | | | |
| Polystyrene | | — | % by mass | | | | | |
| Second resin/First resin × 100 | | — | % by mass | 11.6 | 10.5 | 8.0 | — | — |
| Lubricant/Second resin | | — | — | 0.30 | 0.25 | 0.57 | — | — |
| Grinding method for first powder | | — | — | Cryogenic grinding | Cryogenic grinding | Cryogenic grinding | Cryogenic grinding | Cryogenic grinding |
| Grinding method for second powder | | — | — | Cryogenic grinding | Cryogenic grinding | Cryogenic grinding | Cryogenic grinding | Cryogenic grinding |
| Inorganic powder | Metal powder | — | — | No. 3 | No. 3 | No. 3 | No. 3 | No. 3 |
| Evaluation results of kneaded material | Viscosity | — | P | 3300 | 3500 | 4800 | 7400 | 7200 |
| | Amount of generated formaldehyde | — | ppm | 0.06 | 0.07 | 0.10 | 2.69 | 1.77 |
| Evaluation results of sintered compact | Sintering density | — | — | 98.5 | 98.3 | 97.2 | 95.6 | 96.1 |
| | Appearance | — | — | A | A | B | D | D |
| | Dimensional accuracy | — | — | A | A | B | D | D |

| Classification | Component | Melting point (softening point) | Unit | Comparative Example 16 | Comparative Example 17 | Comparative Example 18 |
|---|---|---|---|---|---|---|
| Binder | First resin | | | | | |
| | Tenac HC750 | 170° C. | % by mass | | | 86 |
| | Tenac 7520 | 160° C. | % by mass | | | |
| | Tenac 7054 | 165° C. | % by mass | | | |
| Second resin | E-GMA-VA | 95° C. | % by mass | | 10 | 10 |
| | E-GMA-MA | 52° C. | % by mass | | | |
| | E-GMA | 103° C. | % by mass | | | |
| | E-GA | 50° C. | % by mass | | | |
| Lubricant | Paraffin wax | 60° C. | % by mass | 2 | 2 | 1 |
| | Microcrystalline wax | 70° C. | % by mass | | | |
| | Polyethylene wax | 110° C. | % by mass | | | |
| | Carnauba wax | 80° C. | % by mass | | | 1 |
| | Stearic acid | 70° C. | % by mass | 3 | 3 | 1 |
| | Stearyl alcohol | 60° C. | % by mass | | | |
| Other | Dibutyl phthalate | — | % by mass | | | |
| | Irganox 245 | — | % by mass | 1 | 1 | 1 |
| EVA | | 45° C. | % by mass | 40 | 35 | |
| Polystyrene | | — | % by mass | 54 | 49 | |
| Second resin/First resin × 100 | | — | % by mass | — | — | 11.6 |
| Lubricant/Second resin | | — | — | — | — | 0.30 |
| Grinding method for first powder | | — | — | Cryogenic grinding | Cryogenic grinding | Non-cryogenic grinding |
| Grinding method for second powder | | — | — | Cryogenic grinding | Cryogenic grinding | Non-cryogenic grinding |
| Inorganic powder | Metal powder | — | — | No. 3 | No. 3 | No. 3 |
| Evaluation results of kneaded material | Viscosity | — | P | 6700 | 5100 | 4700 |
| | Amount of generated formaldehyde | — | ppm | — | — | 2.04 |
| Evaluation results of sintered compact | Sintering density | — | — | 93.8 | 95.8 | 95.2 |
| | Appearance | — | — | D | C | C |
| | Dimensional accuracy | — | — | D | D | D |

E-GMA indicates that an ethylene structure and a glycidyl methacrylate structure are contained.
E-GA indicates that an ethylene structure and a glycidyl acrylate structure are contained.
VA indicates that a vinyl acetate structure is contained, and MA indicates that a methyl acrylate structure is contained.

Examples 26 to 28

First, an alumina powder (powder No. 4) was prepared, and the average particle diameter of the powder was measured using a laser diffraction particle size distribution analyzer. The measured value is shown in Table 1.

Then, sintered compacts were obtained in the same manner as in Example 1 except that a binder having a formulation shown in Table 6 was used as the binder. Incidentally, the degreasing conditions were set such that the temperature was 500° C., the time was 2 hours, and the atmosphere was nitrogen gas (atmospheric pressure). Further, the firing conditions were set such that the temperature was 1,600° C., the time was 3 hours, and the atmosphere was air.

Comparative Examples 19 to 22

Sintered compacts were obtained in the same manner as in Example 1 except that the powder No. 4 was used as the inorganic powder and a binder having a formulation shown in Table 6 was used as the binder.

Comparative Example 23

A sintered compact was obtained in the same manner as in Example 26 except that as the first powder and the second powder in the binder, those obtained by grinding without cooling were used.

TABLE 6

| | Classification | Component | Melting point (softening point) | Unit | Example 26 | Example 27 | Example 28 | Comparative Example 19 | Comparative Example 20 | Comparative Example 21 | Comparative Example 22 | Comparative Example 23 |
|---|---|---|---|---|---|---|---|---|---|---|---|---|
| Binder | First resin | Tenac HC750 | 170° C. | % by mass | 86 | 84 | | 97 | 91 | | | 86 |
| | | Tenac 7520 | 160° C. | % by mass | | | | | | | | |
| | | Tenac 7054 | 165° C. | % by mass | | | 84 | | | | | |
| | Second resin | E-GMA-VA | 95° C. | % by mass | 10 | 10 | | | | | 10 | 10 |
| | | E-GMA-MA | 52° C. | % by mass | | 1 | 3 | | | | | |
| | | E-GMA | 103° C. | % by mass | | | 7 | | | | | |
| | | E-GA | 50° C. | % by mass | | | | | | | | |
| | Lubricant | Paraffin wax | 60° C. | % by mass | 1 | 1 | 2 | | 5 | 2 | 2 | |
| | | Microcrystalline wax | 70° C. | % by mass | | 1 | | | | | | |
| | | Polyethylene wax | 110° C. | % by mass | | | | | | | | |
| | | Carnauba wax | 80° C. | % by mass | 1 | | | | | | | 1 |
| | | Stearic acid | 70° C. | % by mass | 1 | 1.5 | 3 | 2 | 2 | 3 | 3 | 1 |
| | | Stearyl alcohol | 60° C. | % by mass | | | | | | | | |
| | Other | Dibutyl phthalate | — | % by mass | | 0.5 | | | 1 | | | |
| | | Irganox 245 | — | % by mass | 1 | 1 | 1 | 1 | 1 | 1 | 1 | 1 |
| | EVA | | 45° C. | % by mass | | | | | | 40 | 35 | |
| | Polystyrene | | — | % by mass | | | | | | | | |
| | Second resin/First resin × 100 | | — | % by mass | 11.6 | 13.1 | 11.9 | — | — | | | |
| | Lubricant/Second resin | | — | — | 0.30 | 0.32 | 0.50 | — | — | | | |
| | Grinding method for first powder | | — | — | Cryogenic grinding | Cryogenic grinding | Cryogenic grinding | Cryogenic grinding | Cryogenic grinding | | | |
| | Grinding method for second powder | | — | — | Cryogenic grinding | Cryogenic grinding | Cryogenic grinding | Cryogenic grinding | Cryogenic grinding | | | |
| Inorganic powder | Metal powder | | — | — | No. 4 | No. 4 | No. 4 | No. 4 | No. 4 | | | |
| Evaluation results of kneaded material | Viscosity | | — | P | 3600 | 3700 | 4700 | 7800 | 7600 | | | |
| | Amount of generated formaldehyde | | — | ppm | 0.03 | 0.05 | 0.08 | 1.58 | 1.14 | | | |
| Evaluation results of sintered compact | Sintering density | | — | — | 97.9 | 97.5 | 96.8 | 93.1 | 93.4 | | | |
| | Appearance | | — | — | A | A | B | D | D | | | |
| | Dimensional accuracy | | — | — | A | A | B | D | D | | | |

TABLE 6-continued

|  |  |  |  |  |  |  |
|---|---|---|---|---|---|---|
|  | Polystyrene | — | % by mass | 54 | 49 | — |
|  | Second resin/First resin × 100 | — | % by mass | — | — | 11.6 |
|  | Lubricant/Second resin | — | — | — | — | 0.30 |
|  | Grinding method for first powder | — | — | Cryogenic grinding | Cryogenic grinding | Non-cryogenic grinding |
|  | Grinding method for second powder | — | — | Cryogenic grinding | Cryogenic grinding | Non-cryogenic grinding |
| Inorganic powder | Metal powder | — | — | No. 4 | No. 4 | No. 4 |
| Evaluation results | Viscosity | — | P | 8000 | 5100 | 4900 |
| of kneaded material | Amount of generated formaldehyde | — | ppm | — | — | 1.94 |
| Evaluation results | Sintering density | — | — | 92.3 | 94.5 | 94.3 |
| of sintered compact | Appearance | — | — | D | C | C |
|  | Dimensional accuracy | — | — | D | D | D |

E-GMA indicates that an ethylene structure and a glycidyl methacrylate structure are contained.
E-GA indicates that an ethylene structure and a glycidyl acrylate structure are contained.
VA indicates that a vinyl acetate structure is contained, and MA indicates that a methyl acrylate structure is contained.

2. Evaluation of Kneaded Material 2.1 Evaluation of Viscosity

Each of the kneaded materials obtained in Examples and Comparative Examples was maintained at a temperature of 190° C., and the viscosity thereof was measured using a capirograph. The measurement results are shown in Tables 2 to 6.

2.2 Evaluation of Amount of Generated Formaldehyde

For each of the kneaded materials obtained in Examples and Comparative Examples, the amount of formaldehyde generated from the kneaded material during the kneading treatment was measured. The measurement results are shown in Tables 2 to 6. Formaldehyde is generated as the polyacetal-based resin is decomposed, and therefore, by measuring the amount of generated formaldehyde, the measured value can be used as an index of the amount of polyacetal-based resin undesirably decomposed during kneading. Incidentally, the amount of generated formaldehyde was expressed as the concentration of formaldehyde measured at 10 minutes after the initiation of kneading.

2.3 Evaluation by Microscopic Observation

Each of the kneaded materials obtained in Examples and Comparative Examples was placed in fuming nitric acid at 120° C. for 3 hours, whereby the polyacetal-based resin was selectively removed from the kneaded material. The polyacetal-based resin is decomposed at a temperature lower than the softening point in fuming nitric acid, and therefore can be selectively removed. Accordingly, by performing this treatment, the outer layer 22 can be selectively removed from the kneaded material. As a result, in the kneaded material, the inorganic powder and the inner layer 21 mainly remain.

Figure 3A:
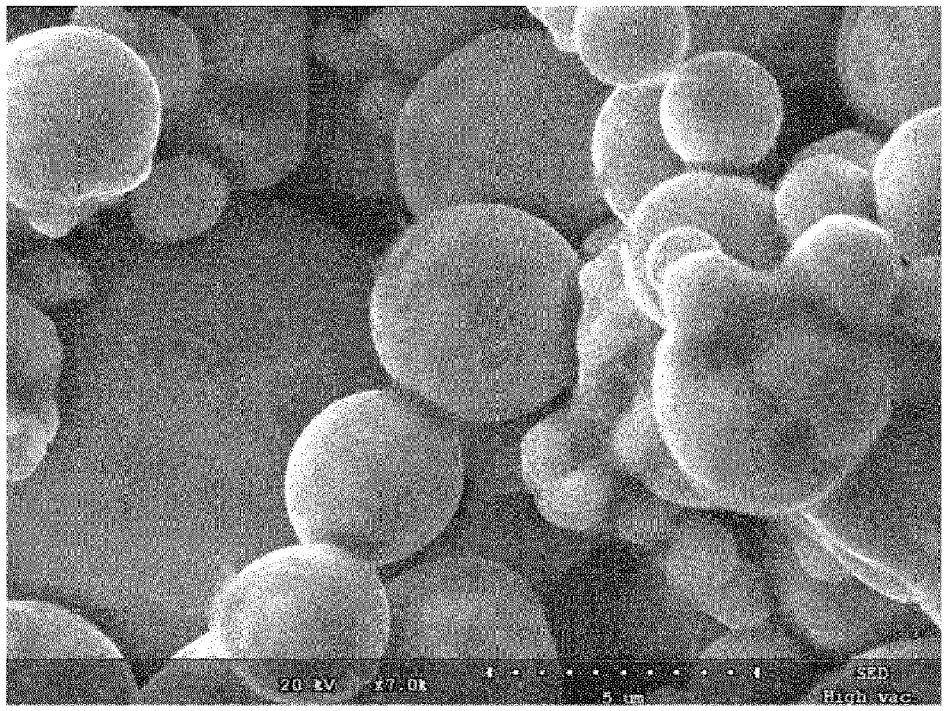
FIGS. 3A and 3B are observed images of compositions for injection molding (kneaded materials) of Example 4 and Comparative Example 2, respectively.
Figure 3B:
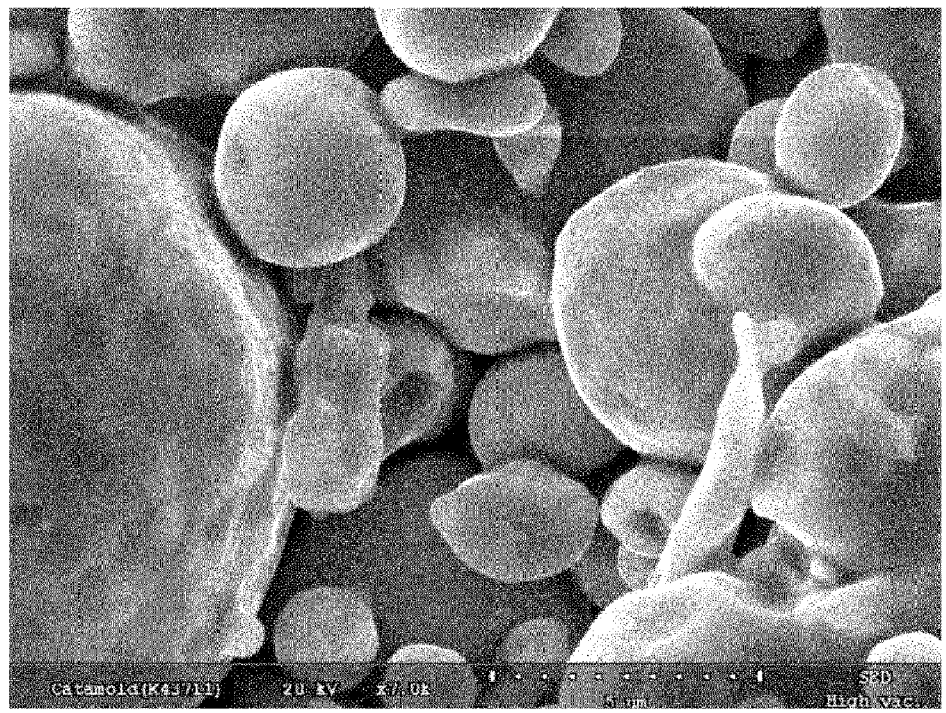

Then, the kneaded material subjected to the fuming nitric acid treatment was observed by a scanning electron microscope. In FIGS. 3A and 3B, observed images of the kneaded materials obtained in Example 4 and Comparative Example 2 are shown as representatives, respectively.

As shown in FIG. 3A, in the case of the kneaded material obtained in Example 4 subjected to the fuming nitric acid treatment, a state in which the inner layer 21 is present so as to connect the inorganic powder particles to one another is observed. Further, it is observed that the surface of a substance which looks like a particle has relatively high smoothness. Accordingly, it is confirmed that the inorganic powder particles shown in FIG. 3A are covered with the inner layer 21 without any uncovered areas.

On the other hand, as shown in FIG. 3B, in the case of the kneaded material obtained in Comparative Example 2 subjected to the fuming nitric acid treatment, the inner layer 21 which is present so as to connect the inorganic powder particles to one another is almost not observed. Further, it is observed that on the surface of a substance which looks like a particle, a difference between light and shade is large, and the surface has relatively low smoothness. Accordingly, it is confirmed that on the surfaces of the inorganic powder particles shown in FIG. 3B, even if the inner layer 21 is present, uncovered areas are present.

Incidentally, a qualitative analysis was performed for the kneaded material obtained in Example 4 subjected to the fuming nitric acid treatment by a Fourier transform infrared spectrophotometer (FT-IR). As a result, a spectrum showing characteristics derived from bonds contained mainly in the glycidyl group-containing polymer was obtained.

From the above results, it is confirmed that in each Example, the inner layer 21 and the outer layer 22 are reliably formed.

3. Evaluation of Sintered Compact 3.1 Evaluation of Sintering Density

The density of each of the sintered compacts obtained in Examples and Comparative Examples was measured by a method according to the Archimedean method (specified in JIS Z 2501). Further, from the measured sintering density and the true density of the inorganic powder, the relative density of the sintered compact was calculated.

3.2 Evaluation of Appearance

The appearance was evaluated according to the following evaluation criteria by observing 100 sintered compacts obtained in each of Examples and Comparative Examples.

Evaluation Criteria for Appearance

A: The number of sintered compacts in which cracking, chipping, or deformation occurred is 3 or less.

B: The number of sintered compacts in which cracking, chipping, or deformation occurred is 4 or more and 10 or less.

C: The number of sintered compacts in which cracking, chipping, or deformation occurred is 11 or more and 50 or less.

D: The number of sintered compacts in which cracking, chipping, or deformation occurred is 51 or more.

3.3 Evaluation of Dimensional Accuracy

The diameters of 100 sintered compacts obtained in each of Examples and Comparative Examples were measured by a micrometer. Then, for the measured values, evaluation was performed according to the following evaluation criteria based on the "Permissible Deviations in Dimensions Without Tolerance Indication for Widths" specified in JIS B 0411 (Permissible Deviations in Dimensions Without Tolerance Indication for Metallic Sintered Products).

Evaluation Criteria for Dimensional Accuracy
- A: Grade is fine (tolerance is ±0.05 mm or less)
- B: Grade is medium (tolerance exceeds ±0.05 mm but is ±0.1 mm or less)
- C: Grade is coarse (tolerance exceeds ±0.1 mm but is ±0.2 mm or less)
- D: Outside the permissible tolerance The evaluation results of the items 2 and 3 are shown in Tables 2 to 6.

As apparent from Tables 2 to 6, it was confirmed that the sintered compacts obtained in the respective Examples have a higher sintering density than the sintered compacts obtained in the respective Comparative Examples. Further, it was confirmed that the sintered compacts obtained in the respective Examples have superior appearance and dimensional accuracy to the sintered compacts obtained in the respective Comparative Examples. Further, in the respective Examples, the amount of formaldehyde generated from the kneaded materials was smaller than in the respective Comparative Examples, and therefore, it is considered that the decomposition of the first resin during kneading was effectively suppressed, and as a result, a decrease in appearance and dimensional accuracy of the sintered compact could be prevented.

4. Evaluation of Sample for Evaluation 4.1 Production of Sample for Evaluation

First, in order to clarify the relationship between the grinding conditions and the state of the kneaded material, by using a binder powder and an inorganic powder, each of which was ground under the following grinding conditions, a kneaded material as a sample for evaluation was produced. As the inorganic powder and the binder powder, the same powders as in Example 3 were used, and kneading was performed under the same conditions as in Example 3, whereby the kneaded material was obtained.

4.2 Evaluation of Viscosity of Sample for Evaluation

Subsequently, the thus produced sample for evaluation was maintained at a temperature of 190° C., and the viscosity thereof was measured using a capirograph. Then, the viscosity was evaluated according to the following evaluation criteria.

Evaluation Criteria for Viscosity
- A: The viscosity is within a range in which both the moldability and the shape retainability can be enhanced.
- B: The viscosity is within a range in which the shape retainability is high but the moldability is slightly poor.
- C: The viscosity is within a range in which both the moldability and the shape retainability are poor.

4.3 Evaluation of Sample for Evaluation by Microscopic Observation

Subsequently, the thus produced sample for evaluation was subjected to the above-described fuming nitric acid treatment, and the outer layer 22 was selectively removed from each sample for evaluation.

Then, the remainder was observed by a scanning electron microscope, and an observed image was obtained.

Evaluation Criteria for Microscopically Observed Image
- A: A lot of necks are observed (necks are present in 70% or more of the interspaces between particulate substances).
- B: A few necks are observed (necks are present in 20% or more and less than 70% of the interspaces between particulate substances).
- C: Necks are not observed (necks are present in less than 20% of the interspaces between particulate substances).

The evaluation results of the items 4.2 and 4.3 are shown in Table 7. Incidentally, the term "neck" refers to a substance which is present so as to connect particulate substances to each other.

TABLE 7

| | Material temperature when grinding [° C.] | Grinding machine temperature [° C.] | Grinding machine rotation speed [rpm] | Average particle diameter [μm] | Evaluation results of viscosity | Evaluation results of microscopically observed image |
|---|---|---|---|---|---|---|
| Sample 1 | −196 | −20 | 3900 | 67 | B | B |
| Sample 2 | −196 | −15 | 5200 | 53 | A | A |
| Sample 3 | 20 | 22 | 8000 | 55 | C | C |

As apparent from Table 7, it was confirmed that the samples 1 and 2 using a powder obtained by cryogenic grinding as the binder powder each had a viscosity suitable for shape retainability, and also in the samples 1 and 2, an inner layer which covers the inorganic powder particle was formed.

On the other hand, the sample 3 using a powder obtained by grinding at normal temperature as the binder powder had low shape retainability, and when the microscopic observation was performed, an inner layer which covers the inorganic powder particle was not observed.

From the above results, it was confirmed that by using a binder powder obtained by cryogenic grinding and also by optimizing the grinding machine rotation speed and the average particle diameter, a composition for injection molding capable of forming a molded body having higher shape retainability can be produced.

The entire disclosure of Japanese Patent Application No. 2011-262958, filed Nov. 30, 2011 is expressly incorporated by reference herein.

What is claimed is:

1. A method for producing a composition for injection molding which contains an inorganic powder composed of at least one of a metal material and a ceramic material and a binder containing a polyacetal-based resin and a glycidyl group-containing polymer, wherein the method comprises:
   cryogenically grinding a first resin containing the polyacetal-based resin as a main component;
   cryogenically grinding a second resin containing the glycidyl group-containing polymer as a main component;
   mixing a powder obtained by grinding the first resin, a powder obtained by grinding the second resin, and the inorganic powder, thereby obtaining a mixed powder; and
   kneading the mixed powder,
   wherein the powder obtained by grinding the first resin has an average particle size that is 3 to 20 times an average particle size of the inorganic powder; and
   the powder obtained by grinding the second resin has an average particle size that is 3 to 50 times the average particle size of the inorganic powder.

2. The method for producing a composition for injection molding according to claim 1, wherein the second resin is an unsaturated glycidyl group-containing polymer.

3. The method for producing a composition for injection molding according to claim 2, wherein the melting point of the unsaturated glycidyl group-containing polymer is 65° C. or higher and 105° C. or lower.

4. The method for producing a composition for injection molding according to claim 2, wherein the unsaturated glycidyl group-containing polymer is a copolymer containing an unsaturated glycidyl group-containing monomer and an ethylenically unsaturated ester compound monomer.

5. The method for producing a composition for injection molding according to claim 2, wherein the unsaturated glycidyl group-containing polymer is a copolymer containing an unsaturated glycidyl group-containing monomer and a nonpolar α-olefin-based monomer.

6. The method for producing a composition for injection molding according to claim 3, wherein the unsaturated glycidyl group-containing polymer is a copolymer containing an unsaturated glycidyl group-containing monomer and an ethylenically unsaturated ester compound monomer.

7. The method for producing a composition for injection molding according to claim 3, wherein the unsaturated glycidyl group-containing polymer is a copolymer containing an unsaturated glycidyl group-containing monomer and a nonpolar α-olefin-based monomer.

8. The method for producing a composition for injection molding according to claim 1, wherein the average particle size of the powder obtained by grinding the second resin is 2 to 15 times greater than the average particle size of the powder obtained by grinding the first resin.

9. A composition for injection molding, which is produced by the method for producing a composition for injection molding according to claim 1, and has:
  an inner layer composed mainly of the second resin and covering each particle of the inorganic powder, and
  an outer layer composed mainly of the first resin and located outside the inner layer.

10. The method for producing a composition for injection molding according to claim 1, wherein the melting point of the glycidyl group-containing polymer is lower than that of the polyacetal-based resin and the mass content of the glycidyl group-containing polymer in the composition for injection molding is less than that of the polyacetal-based resin.

11. The method for producing a composition for injection molding according to claim 10, wherein in the kneading, the mixed powder is kneaded at a temperature between the melting point of the first resin and the melting point of the second resin.

12. The method for producing a composition for injection molding according to claim 11, wherein the second resin is an unsaturated glycidyl group-containing polymer.

13. The method for producing a composition for injection molding according to claim 12, wherein the melting point of the unsaturated glycidyl group-containing polymer is 65° C. or higher and 105° C. or lower.

14. The method for producing a composition for injection molding according to claim 12, wherein the unsaturated glycidyl group-containing polymer is a copolymer containing an unsaturated glycidyl group-containing monomer and an ethylenically unsaturated ester compound monomer.

15. The method for producing a composition for injection molding according to claim 12, wherein the unsaturated glycidyl group-containing polymer is a copolymer containing an unsaturated glycidyl group-containing monomer and a nonpolar α-olefin-based monomer.

16. The method for producing a composition for injection molding according to claim 10, wherein the second resin is an unsaturated glycidyl group-containing polymer.

17. The method for producing a composition for injection molding according to claim 16, wherein the melting point of the unsaturated glycidyl group-containing polymer is 65° C. or higher and 105° C. or lower.

18. The method for producing a composition for injection molding according to claim 16, wherein the unsaturated glycidyl group-containing polymer is a copolymer containing an unsaturated glycidyl group-containing monomer and an ethylenically unsaturated ester compound monomer.

19. The method for producing a composition for injection molding according to claim 16, wherein the unsaturated glycidyl group-containing polymer is a copolymer containing an unsaturated glycidyl group-containing monomer and a nonpolar α-olefin-based monomer.

20. A composition for injection molding, which is produced by the method for producing a composition for injection molding according to claim 2, and has:
  an inner layer composed mainly of the second resin and covering each particle of the inorganic powder, and
  an outer layer composed mainly of the first resin and located outside the inner layer.

* * * * *